(12) United States Patent
McKenney

(10) Patent No.: US 9,830,201 B2
(45) Date of Patent: *Nov. 28, 2017

(54) LOW OVERHEAD CONTENTION-BASED SWITCHING BETWEEN TICKET LOCK AND QUEUED LOCK

(71) Applicant: International Business Machines Corporation, Armonk, NY (US)

(72) Inventor: Paul E. McKenney, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 42 days.

This patent is subject to a terminal disclaimer.

(21) Appl. No.: 14/831,068

(22) Filed: Aug. 20, 2015

(65) Prior Publication Data

US 2015/0355953 A1 Dec. 10, 2015

Related U.S. Application Data

(63) Continuation of application No. 14/284,896, filed on May 22, 2014.

(60) Provisional application No. 61/826,237, filed on May 22, 2013.

(51) Int. Cl.
*G06F 9/52* (2006.01)
*G06F 17/30* (2006.01)

(52) U.S. Cl.
CPC ........ *G06F 9/526* (2013.01); *G06F 17/30171* (2013.01)

(58) Field of Classification Search
None
See application file for complete search history.

(56) References Cited

U.S. PATENT DOCUMENTS

| 5,790,851 | A | * | 8/1998 | Frank | G06F 9/52 718/100 |
|---|---|---|---|---|---|
| 6,473,819 | B1 | * | 10/2002 | Jackson | G06F 9/52 710/200 |
| 6,480,918 | B1 | | 11/2002 | McKenney et al. | |
| 6,792,601 | B1 | * | 9/2004 | Dimpsey | G06F 9/443 710/200 |
| 6,842,809 | B2 | | 1/2005 | Browning et al. | |
| 7,747,805 | B2 | | 6/2010 | McKenney | |
| 8,838,944 | B2 | * | 9/2014 | Chen | G06F 9/3004 711/150 |
| 2001/0014905 | A1 | * | 8/2001 | Onodera | G06F 9/52 718/102 |

(Continued)

OTHER PUBLICATIONS

International Business Machines Corporation, "List of IBM Patents or Patent Applications Treated as Related", Oct. 14, 2015, 2 pages.

(Continued)

*Primary Examiner* — Wissam Rashid
(74) *Attorney, Agent, or Firm* — Walter W. Duft

(57) ABSTRACT

A technique for low overhead contention-based switching between ticket locking and queued locking to access shared data may include establishing a ticket lock, establishing a queue lock, operating in ticket lock mode using the ticket lock to access the shared data during periods of relatively low data contention, and operating in queue lock mode using the queue lock to access the shared data during periods of relatively high data contention.

7 Claims, 8 Drawing Sheets

(56) References Cited

U.S. PATENT DOCUMENTS

| | | | |
|---|---|---|---|
| 2007/0006232 A1* | 1/2007 | Bliss | G06F 9/526 718/100 |
| 2011/0072241 A1* | 3/2011 | Chen | G06F 9/3004 712/202 |
| 2012/0198111 A1* | 8/2012 | Siegwart | G06F 12/00 710/200 |
| 2012/0240126 A1* | 9/2012 | Dice | G06F 9/526 718/104 |

OTHER PUBLICATIONS

T. Anderson, "The Performance of Spin Lock for Shared-Memory Multiprocessors", IEEE Transactions on Parallel and Distributed Systems, vol. 1, No. 1, Jan. 1990, pp. 6-16.

S. Boyd-Wickizer et al., "Non-scalable locks are dangerous", Proceedings of the Linux Symposium (OLS 2012), Jul. 2012, 12 pages.

C. Bloom, "Atman's multi-way ticket lock", <http://cbloomrants.blogspot.com/2011/07/07-17-11-atman-multi-way-ticket-lock_17.html>, Jul. 2011, 5 pages.

T. Craig, "Building FIFO and Priority-Queuing Spin Locks from Atomic Swap", Technical Report 93-02-02, University of Washington, Feb. 1, 1993, 29 pages.

J. Eastep et al., "Smartlocks: Self-Aware Synchronization through Lock Acquisition Scheduling", Proceedings of the 7th International Conference on Autonomic Computing, ICAC '10, 2010, pp. 215-224.

J. Fitzhardinge, "Paravirtualized Ticketlocks", <http://lwn.net/Articles/493402/, Apr. 2012, 6 pages.

G. Graunke et al., "Synchronization Algorithms for Shared-Memory Multiprocessors", IEEE Computer, vol. 23, No. 6, Jun. 1990, pp. 60-69.

P. Ha et al., "Reactive Spin-locks: A Self-tuning Approach", Technical Report 2005:16, Department of Computing Science and Engineering, Chalmers University of Technology and Goteborg University, 2005, 14 pages.

B. Lim et al., "Waiting Algorithms for Synchronization in Large-Scale Multiprocessors", Transactions on Computer Systems, vol. 11, No. 3, Aug. 1993, pp. 253-294.

B. Lim et al., "Reactive Synchronization Algorithms for Multiprocessors", <ftp://hing.lcs.mit.edu/pub/papers/reactive.ps.Z>, Mar. 28, 1994, 11 pages.

P. Magnusson et al., "Efficient Software Synchronization on Large Cache Coherent Multiprocessors", Technical Report T94:07, Swedish Institute of Computer Science, Feb. 18, 1994, 32 pages.

J. Mellor-Crummy et al, "Scalable Reader-Writer Synchronization for Shared-Memory Multiprocessors", Proceedings of the Third PPOPP, Apr. 1991, pp. 106-113.

Z. Radovic et al., "Efficient Synchronization for Nonuniform Communication Architectures", Proceedings of the 2002 ACM/IEEE Conference on Supercomputing, Nov. 2002, pp. 1-13.

Z. Radovic et al., "Hierarchical Backoff Locks for Nonuniform Communication Architectures", Proceedings of the Ninth International Symposium on High Performance Computer Architecture (HPCA-9), Feb. 2003, pp. 241-252.

M. Scott et al., "Scalable Queue-Based Spin Locks with Timeout", Proceedings of the Eighth ACM SIGPLAN Symposium on Principles and Practice of Parallel Computing, PPoPP '01, Jun. 2001, pp. 44-52.

S. Sivasubramanian et al., "Fairlocks—A High Performance Fair Locking Scheme", Proceedings of the 14th International Conference on Parallel and Distributed Computing and Systems, Nov. 2002, pp. 246-251.

H. Takada et al., "A Bounded Spin Lock Algorithm with Preemption", Technical Report 93-02, University of Tokyo, 1993, 22 pages.

R. Van Riel, "Make ticket spinlock proportional backoff w/ auto tuning", <https://lkml.org/lkml/2013/1/3/9> Jan. 2013, 7 pages.

R. Wisniewski et al, "Scalable Spin Locks for Multiprogrammed Systems", 8th IEEE Int'l Parallel Processing Symposium, Apr. 1994, 7 pages.

* cited by examiner

LOW OVERHEAD CONTENTION-BASED SWITCHING BETWEEN TICKET LOCK AND QUEUED LOCK

This application is a continuation under 35 U.S.C. 120 of application Ser. No. 14/284,896, filed May 22, 2014, entitled "Low Overhead Contention-Based Switching Between Ticket Lock And Queued Lock."

BACKGROUND

1. Field

The present disclosure relates to computer systems and methods in which data resources are shared among data consumers while preserving data integrity and consistency relative to each consumer. More particularly, the disclosure concerns locking.

2. Description of the Prior Art

By way of background, although ticket locks work reasonably well for exclusive locking, they can nevertheless perform poorly at high contention levels due to the large number of CPUs spinning on the lock. On some hardware platforms, updating the lock can be slow due to the need to invalidate the corresponding cache lines on large numbers of CPUs, which degrades unlock performance.

There are a number of approaches that have been used to solve similar problems:

1. Use a combination of spinning and blocking so as to reduce memory contention on the spinlock. These schemes are well known and include exponential backoff, but have problems with unfairness, especially on large systems. More recently, this approach has been applied to ticket locking, allowing long-term spinners to sleep when running on a hypervisor.

2. Use a queued lock instead of a ticket lock. There are a large number of queued locks. However, all of these perform poorly at low levels of contention. And if software is performing and scaling well, it has to be operating at low levels of contention most of the time. Nevertheless, high levels of contention can occur from time to time, even in the Linux® kernel.

3. Use a spinlock, but calibrate delay to avoid memory contention. This can result in unfairness and delays with the lock not held, but does reduce memory contention. Such an approach has been implemented for the Linux® kernel.

4. Optimize ticket locks for more efficient spinning. As far as known, there is not a complete implementation of this idea available at present, but it multiplies the size of each lock by roughly the number of CPUs, which is prohibitive in cases such as the Linux® kernel where there can be large numbers of CPUs. The literature does mention the possibility of spinning on the stack, but this would still require some way of getting from the ticket-lock shard to the stack, which still multiplies the size by some function of the number of CPUs. It would be far better to maintain a single queue, which would provide the same memory-contention benefits at far lower memory overhead.

5. Dynamically switch between a simple spinlock and a queued lock, so that the simple spinlock is used at low contention levels and the queued lock is used at high contention levels. A few schemes are known, including:
   (a) Switching between a test-and-set and queued lock.
   (b) Switching between the AIX® simple lock to a NUMA-aware queued lock.
   (c) Switching among multiple lock families, but using heavyweight synchronization (locking) to carry out the switch.

However, these either exclude ticket lock, which means that they give up fairness at moderate contention levels, or have a heavyweight switch mechanism, which slows down switches and requires complex heuristics to avoid switching too often.

What is needed is a scheme that provides high performance at low levels of contention, fairness at moderate levels of contention, and avoidance of throughput collapse at high levels of contention, while avoiding heavy-weight switching mechanisms. In addition, the per-lock memory footprint should not change significantly.

SUMMARY

A method, system and computer program product are provided to implement low overhead contention-based switching between ticket locking and queued locking to access shared data. In an example embodiment the technique may include establishing a ticket lock, establishing a queue lock, operating in ticket lock mode using the ticket lock to access the shared data during periods of relatively low data contention, and operating in queue lock mode using the queue lock to access the shared data during periods of relatively high data contention.

In an example embodiment, a switch from the ticket lock mode to the queue lock mode may comprise changing a counter in the ticket lock from a ticket-lock state that signifies the ticket lock mode to a queue-lock state that signifies the queued lock mode.

In an example embodiment, the periods of relatively low contention and relatively high contentions may be determined by a number of requesters spinning on the ticket lock.

In an example embodiment, the ticket lock mode may comprises operations that include ticket lock acquisition, ticket lock release, ticket lock acquisition spin pass processing, and processing to transition from ticket lock mode to queue lock mode when appropriate.

In an example embodiment, the queue lock mode may comprise operations that include queue lock acquisition, queue lock hand-off, and processing to transition from queue lock mode to ticket lock mode when appropriate.

In an example embodiment, there may be a plurality of ticket locks and queue locks. The queue locks may each comprise a queue head that heads a queue of queue lock elements, the queue heads being arranged in a queue lock array, and at least one of the queue heads being associated with a corresponding one of the ticket locks.

In an example embodiment, there may be a plurality of ticket locks, each of which is assigned to a dedicated queue lock queue comprising queue lock elements.

BRIEF DESCRIPTION OF THE DRAWINGS

The foregoing and other features and advantages will be apparent from the following more particular description of example embodiments, as illustrated in the accompanying Drawings, in which.

DETAILED DESCRIPTION OF EXAMPLE EMBODIMENTS

Figure 1:
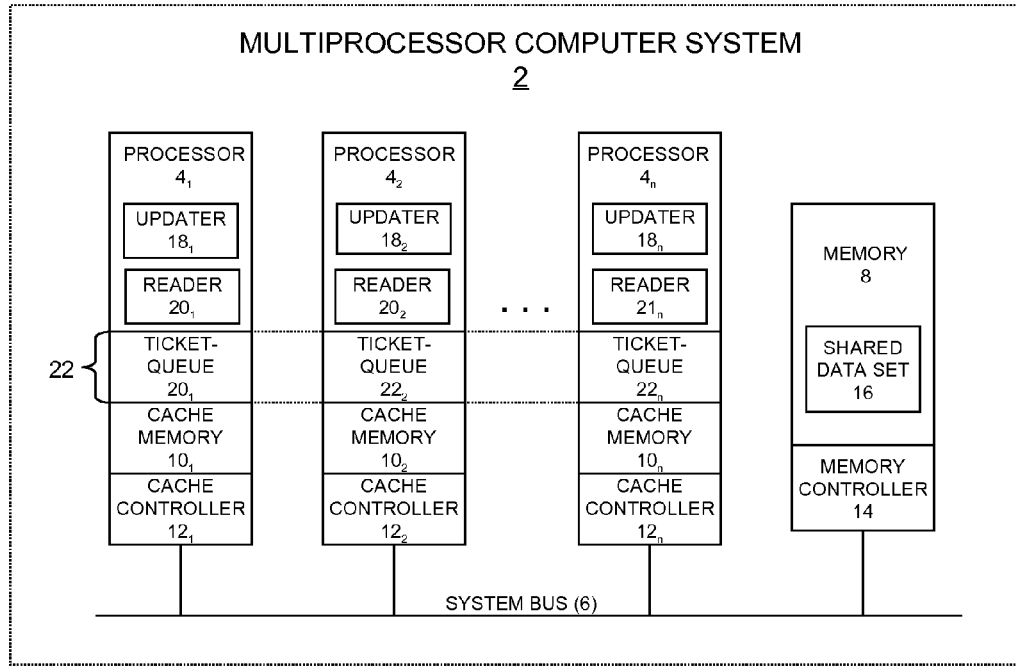
FIG. 1 is a logical block diagram showing an example computer system.

Turning now to the drawing figures, wherein like reference numbers represent like elements in all of the several views, FIG. 1 illustrates an example computer system 2 in which the locking technique described herein may be implemented. The computer system 2 may include multiple processors $4_1, 4_2 \ldots 4_n$, a system bus 6, and a program memory 8. There are also cache memories $10_1, 10_2 \ldots 10_n$ and cache controllers $12_1, 12_2 \ldots 12_n$ respectively associated with the processors $4_1, 4_2 \ldots 4_n$. A memory controller 14 is associated with the memory 8. As shown, the memory controller 14 may reside separately from processors $4_2 \ldots 4_n$ (e.g., as part of a chipset). Alternatively, the memory controller 14 could be provided by plural memory controller instances respectively integrated with the processors 42 . . . 4n.

The computer system 2 may represent any of several different types of computing apparatus. Such computing apparatus may include, but are not limited to, general purpose computers, special purpose computers, portable computing devices, communication and/or media player devices, set-top devices, embedded systems, and other types of information handling machines. The term "processor" as used with reference to the processors $4_1, 4_2 \ldots 4_n$ encompasses any program execution unit capable of executing program instructions, including but not limited to a packaged integrated circuit device (such as a microprocessor), a processing core within a packaged integrated circuit device (such as a microprocessor core), or a hardware thread comprising one or more functional units within a processing core (such as an SMT thread). Each such execution unit may be referred to as a CPU (central processing unit). The processors $4_1, 4_2 \ldots 4_n$ may be situated within a single computing device or node (e.g., as part of a single-node SMP system) or they may be distributed over plural nodes (e.g., as part of a NUMA system, a cluster, or a cloud). The memory 8 may comprise any type of non-transitory tangible storage medium capable of storing data in computer readable form for use in program execution, including but not limited to, any of various types of random access memory (RAM), various flavors of programmable read-only memory (PROM) (such as flash memory), and other types of primary storage (i.e., program memory). The cache memories $10_1, 10_2 \ldots 10_n$ may be implemented in several levels (e.g., as level 1, level 2 and level 3 caches) and the cache controllers $12_1, 12_2 \ldots 12_n$ may collectively represent the cache controller logic that supports each cache level. As illustrated, the memory controller 14 may reside separately from processors $4_1, 4_2 \ldots 4_n$, for example, as part of a discrete chipset. Alternatively, the memory controller 14 could be provided by plural memory controller instances that are respectively integrated with the processors $4_1, 4_2 \ldots 4_n$.

Each CPU embodied by a given processor 4 is operable to execute program instruction logic under the control of a program stored in the memory 8 (or elsewhere). As part of this program execution logic, update operations (updaters) 18 may execute within a process, thread, or other execution context (hereinafter "task") on any of the processors 4. Each updater 18 runs periodically to perform updates on a set of shared data 16 that may be stored in the shared memory 8 (or elsewhere). In FIG. 1, reference numerals $18_1, 18_2 \ldots 18_n$ illustrate individual data updaters that respectively execute on the several processors $4_1, 4_2 \ldots 4_n$. Any given processor 4 may also execute a read operation (reader) 20. Each reader 20 runs from program instructions stored in the memory 8 (or elsewhere) in order to periodically perform read operations on the set of shared data 16 stored in the shared memory 8 (or elsewhere). In FIG. 1, reference numerals $20_1, 20_2 \ldots 20_n$ illustrate individual reader instances that may respectively execute on the several processors $4_1, 4_2 \ldots 4_n$.

The updaters 18 and the readers 20 represent requesters that contend for the shared data 16. To facilitate synchronized access to the shared data 16 by such requesters, the updaters 18 and the readers 20 may utilize a hybrid ticket-queue lock implementation 22 as part of their respective operations. In FIG. 1, reference numbers $20_1, 20_2 \ldots 20_n$ represent individual ticket-queue lock implementation instances that may periodically execute on the several processors $4_1, 4_2 \ldots 4_n$ as they are invoked by the updaters 18 and the readers 20. Various features and functions of the ticket-queue lock implementation 22 will now be described.

Introduction to Ticket-Queue Locking

The ticket-queue lock implementation 22 provides a solution to the need for a ticket lock scheme that provides high performance at low levels of contention, fairness at moderate levels of contention, and avoidance of throughput collapse at high levels of contention, while avoiding heavyweight switching mechanisms.

The solution provided by the ticket-queue lock implementation 22 is to use a ticket lock at low and moderate levels of contention, but to switch to a queued lock at high levels of contention. There are a number of ways of accomplishing this task:

1. Associate a queued-lock header with each ticket lock. This has the advantage of simplicity, but at a high cost in terms of memory consumption, especially given that the majority of locks never reach high contention levels.

2. Provide a single global queue that is used for the lock with the highest contention. This works well for systems with tens of CPUs, but systems with thousands of CPUs can easily saturate a large number of locks.

3. Provide an array of global queues so as to allow multiple saturated locks to each use a queue. However, if a large number of queues is provided, as would be the case for systems with thousands of CPUs, the overhead of searching for a free queue can be excessive.

4. Provide an array of global queues, but hash the ticket-lock address to start the search, so that in the common case the first queue is available. This is the preferred embodiment.

In all cases, the switch strategy relies on specific properties of the underlying ticket lock in order to allow fast low-contention operation and light-weight switching between non-queued and queued modes.

Data Structures

Figure 2:
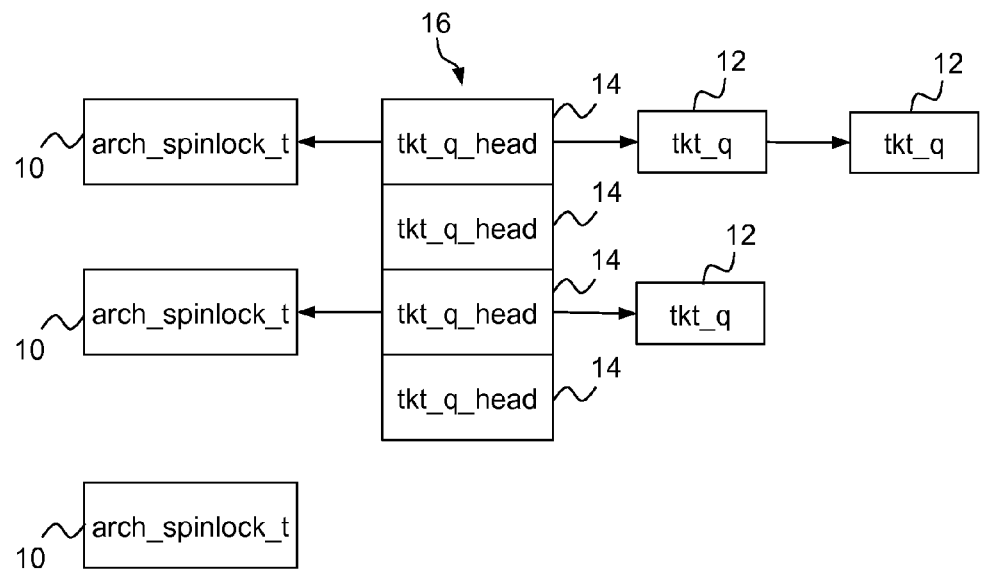
FIG. 2 is a logical block diagram showing example ticket lock and queue lock data structures.
Figure 3:
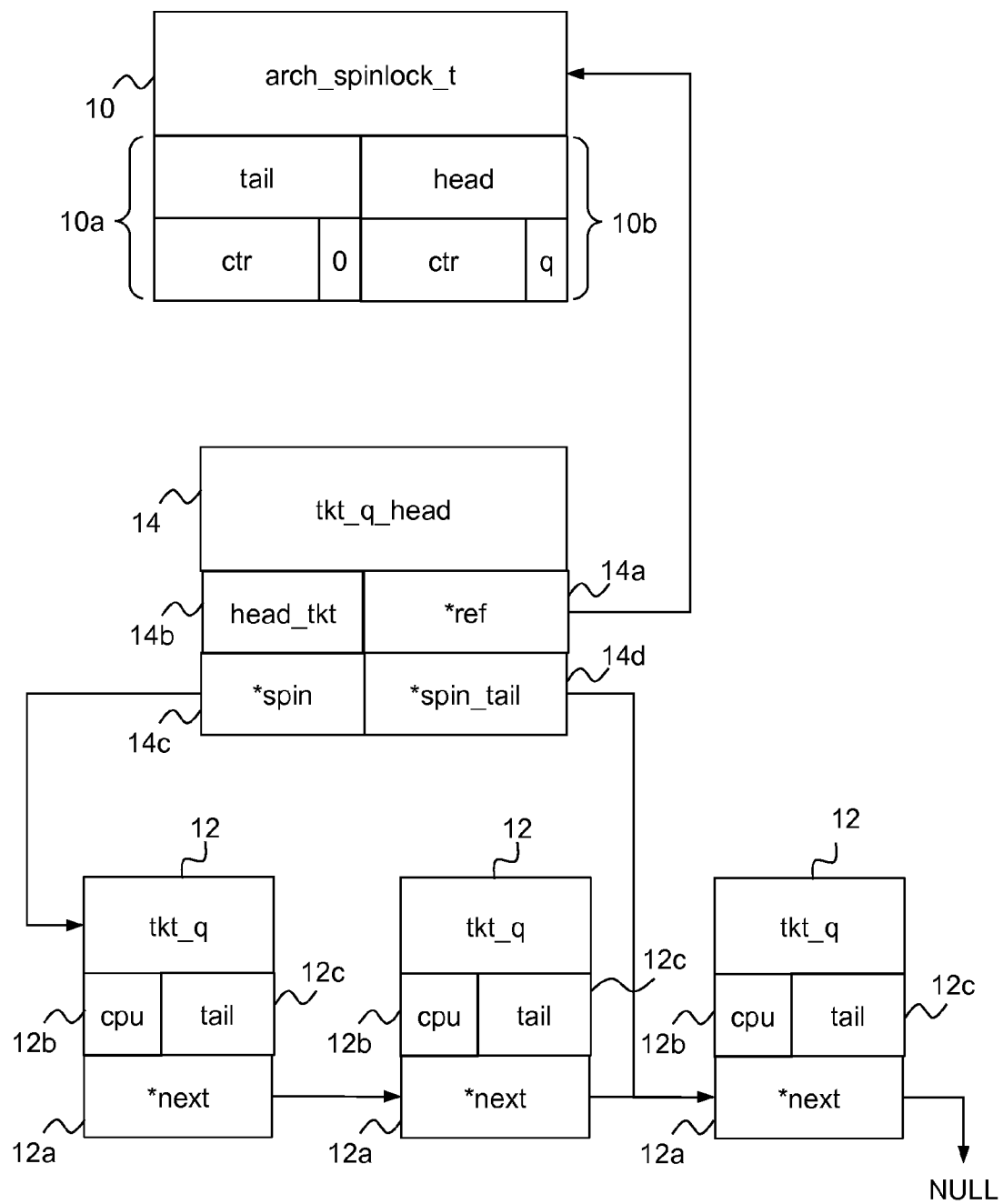
FIG. 3 is a logical block diagram showing example elements of the ticket lock and queue lock data structures of FIG. 2.

Data structures used in the preferred embodiment are shown in FIGS. 2-3. Example source code (written in the C programming language) that may be used to implement these data structures is shown in Code Listing 1 below:

```
                    Code Listing 1:
1   typedef u16 ___ticket_t;
2   typedef u32 ___ticketpair_t;
3
4   typedef struct arch_spinlock {
5       union {
6               ___ticketpair_t head_tail;
7               struct ___raw_tickets {
8                       ___ticket_t head, tail;
9               } tickets;
10      };
11  }arch_spinlock_t;
12
13  struct tkt_q {
14      int cpu;
15      ___ticket_t tail;
16      struct tkt_q *next;
17  };
18
19  struct tkt_q_head {
20      arch_spinlock_t *ref;
21      s32 head_tkt;
22      struct tkt_q *spin;
23      struct tkt_q **spin_tail;
24  };
25
26  #define TKT_Q_SWITCH (16 * 2)
27  #define TKT_Q_NQUEUES (((NR_CPUS + TKT_Q_SWITCH -
        1) / TKT_Q_SWITCH) * 2)
28
29  struct tkt_q_head tkt_q_heads[TKT_Q_NQUEUES];
```

In the Code Listing 1, _ticket_t, _ticketpair_t, and the arch_spinlock_t structure on lines 1-11 are prior art from the Linux® kernel. In FIGS. 2-3, the arch_spinlock_t structure is shown by reference number 10. The preferred embodiment of the disclosed locking technique uses the difference between the →head and →tail fields 10a and 10b of this structure to decide when to switch to queued operation, though any number of other decision criteria could be used, including time spent spinning, a digitally filtered function of lock hold time, a digitally filtered function of lock grants per unit time, and so on. The arch_spinlock_t structure 10 represents an example embodiment of a ticket lock. The →tail field 10b is a ticket lock acquisition counter and the →head field 10a is a ticket lock release counter. These counters may also be referred to as tickets.

The tkt_q structure shown on lines 13-17 of Code Listing 1 represents an example embodiment of a queue lock element upon which a given CPU spins. This structure, shown by reference number 12 in FIGS. 2-3, is allocated on the stack of the spinning CPU, linked via its →next field 12a. The →cpu field 12b is set to the CPU number of the spinning CPU, and is set to −1 when that CPU is granted the lock. The →tail field 12c is set to the arch_spinlock_t's →tail field 10a at the time that the corresponding CPU registered itself with the ticket lock, however, this field is used only for debugging purposes and could be dispensed with in production environments.

The tkt_q_head structure on lines 19-24 of Code Listing 1 is the queue head for a queue of tkt_q structures queue lock elements 12. It represents an example embodiment of a queue lock queue head. This structure is shown by reference number 14 in FIGS. 2-3. The combination of each tkt_q_head (queue head) structure 14 and its queue of tkt_q (queue lock element) structures 12 represents an example embodiment of a queue lock. An array 16 of tkt_q_head structures 14 is provided, indexed by a hash function of the address of the corresponding arch_spinlock_t 10 (at least in the common case of no collisions). The →ref field 14a is NULL if there is no associated arch_spinlock_t (ticket lock) structure 10, 0x1 if a ticket lock is in the process of being associated with this struct tkt_q_head 14, or the address of the arch_spinlock_t 10 if the association is in full force. The →head_tkt field 14b is used to resolve a race condition between associating an arch_spinlock_t structure 10 with a tkt_q_head 14 (and its associated queue) on the one hand and releasing the arch_spinlock_t structure ticket lock on the other. The →spin field 14c references the first tkt_q structure 12 on the queue, or is NULL if the queue is empty. The →spin_tail field 14d references the →next field 12a of the last tkt_q structure 12 on the queue, or references the →spin field 14c if the queue is empty.

The definition on line 26 of the Code Listing 1 gives the number of spinning acquisitions that provoke a switch to queued mode. The definition on line 27 determines the number of queue head elements in the array 16 of tkt_q_head structures 14, which is shown on line 29.

The relationships among these data structures are depicted in FIGS. 2-3. In FIG. 2, the first and third tkt_q_head structures 14 are each associated with an arch_spinlock_t structure 10, and each also has a queue of tkt_q structures 12, one for each CPU spinning on the corresponding arch_spinlock_t.

Note that not all tkt_q_head structures 14 are associated with an arch_spinlock_t structure 10, as is the case with the second and fourth tkt_q_head structures. However, only those tkt_q_head structures 14 that are associated with (or have recently been associated with) a arch_spinlock_t structure 10 may have queues of tkt_q structures 12. Similarly, not all arch_spinlock_t structures 10 are associated with tkt_q_head structures 14. In fact, on many systems none of the arch_spinlock_t structures 10 will be so associated. And even on heavily loaded systems, only a few of the many thousands of arch_spinlock_t structures 10 will be associated, because there are only so many CPUs with which to drive lock contention.

In the discussion to follow, the data structures shown in FIGS. 2-3 collectively represent an example of a hybrid ticket lock-queue lock, with the arch_spinlock_t structure 10 representing the ticket lock component and the tkt_q_head structure 14 and its queue of tkt_q structures 12 representing the queue lock component. This hybrid lock may be referred to as a ticket-queue lock.

Theory of Operation

A ticket-queue lock is initially in non-queued (ticket lock) mode, but can transition to and from queued (queue lock) mode. This section covers both normal operations and resolving race conditions.

Normal Operation

This section gives an overview of the following ticket lock-queue lock operations:
 1. Operation in non-queued mode.
 2. Entering queued mode.
 3. Lock acquisition in queued mode.
 4. Lock hand-off in queued mode.
 5. Exiting queued mode.

Each situation is covered by one of the following sections.

Non-Queued (Ticket Lock) Mode

The operation of the ticket-queue lock in non-queued mode is quite similar to that of a normal ticket lock. The main difference, as shown in FIG. 3, is that the low-order bit of each of the pair of counters 10a and 10b of the CPU's arch_spinlock_t structure 10 is reserved. The low-order bit of the →tail counter 10a (the one incremented when attempting to acquire the lock) is always zero, while the low-order bit of the →head counter 10b (the one incremented when releasing the lock) is zero in non-queued (ticket lock) mode and one in queued mode. This of course means that the →head and →tail counters 10a and 10b are incremented by two rather than by one.

This also means that the head and tail counters will never compare equal when the ticket-queue lock is in queued mode, which means that all CPUs attempting to acquire the lock will be forced onto the slow path (queue lock mode). The fast path through non-queued-mode lock acquisition incurs almost no additional overhead due to the possibility of queuing.

Figure 4:
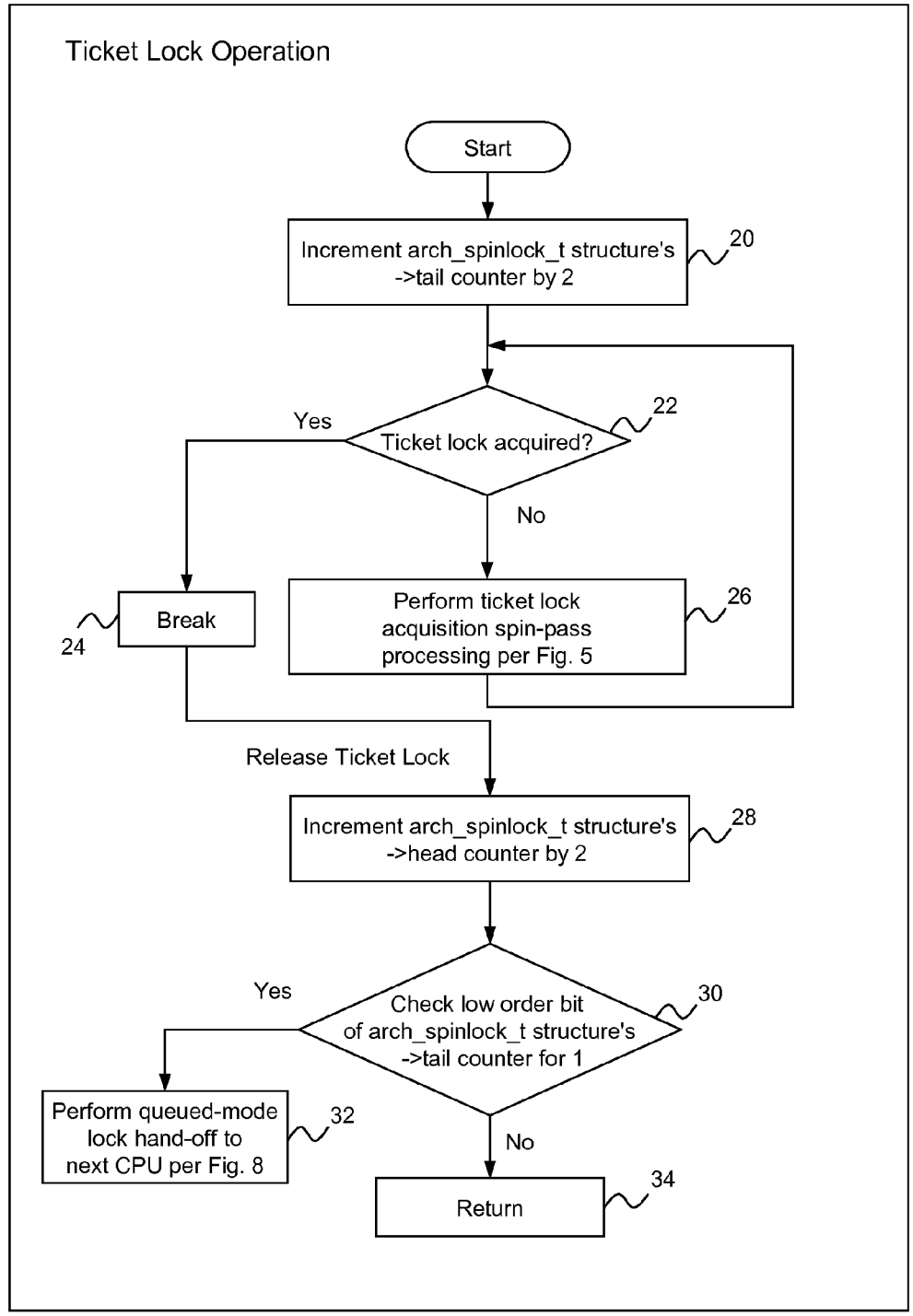
FIG. 4 is a flow diagram showing example ticket lock operation processing.

FIG. 4 presents an overview of ticket lock mode operation, as follows:

1. Per block 20, initiate ticket lock acquisition, in which one of the updaters 18 or readers 20 shown in FIG. 1 (requesters) attempts to acquire the lock in order to access the shared data 16. In particular, the requester increments (by 2) the →tail counter 10a of the CPU's arch_spinlock_t structure 10.

2. Per block 22, check whether the ticket lock acquisition was successful (due to the →tail and →head counters 10a and 10c being equal). Block 24 is reached if the lock has been acquired, and the requester enters its critical section (to access the shared data 16). Block 26 is reached if ticket lock acquisition was unsuccessful. It represents ticket-mode acquisition spin processing as described below in connection with FIG. 5.

3. Per block 28, initiate ticket lock release as the lock-holding requester leaves its critical section. In particular, the requester increments the arch_spinlock_t structures →head counter by 2.

4. Per block 30, check the low order bit of the arch_spinlock_t structure's →head counter 10b for 1 to determine whether there has been a transition to queue lock mode while the requester was in its critical section. If so, block 32 performs a queue lock mode hand-off to the next CPU, as described below in connection with FIG. 8. Block 34 is reached if queue lock mode is not in effect, representing successful ticket lock release.

Figure 5:
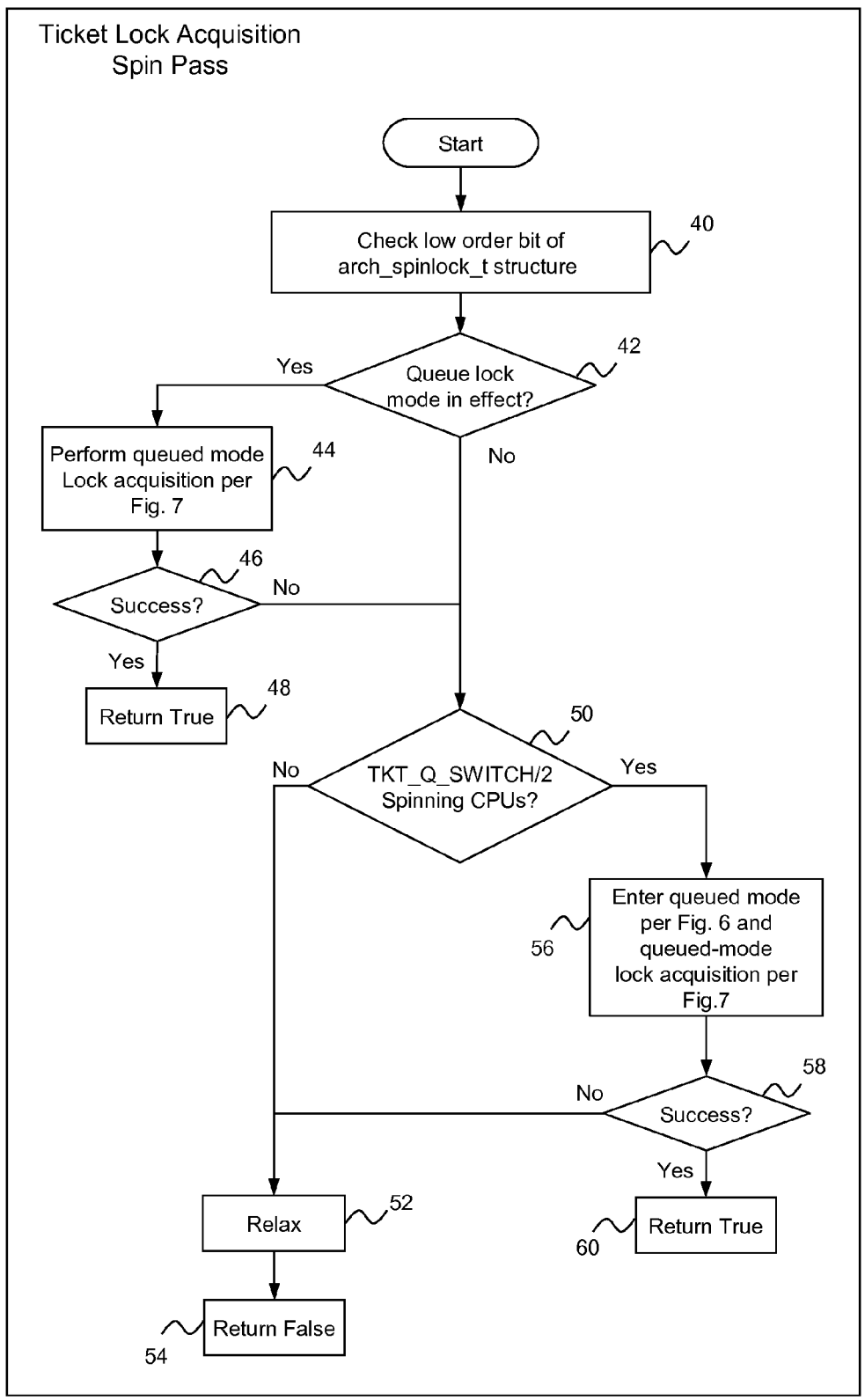
FIG. 5 is a flow diagram showing example ticket acquisition spin pass processing.

FIG. 5 presents an overview of ticket lock acquisition spin pass processing, as performed in block 26 of FIG. 2, as follows:

1. Per block 40, check the low order bit of this CPU's arch_spinlock_t stucture's →head counter 10b.

2. Per block 42, determine based on the value of the →head counter's low order bit (1 or 0) whether queue lock mode is in effect. If it is, per block 44, perform queued mode lock acquisition, as described below in connection with FIG. 7.

3. Per block 46, determine whether queue lock acquisition was successful. If it was, return to the caller per block 48 to indicate that the requester now holds the ticket-queue lock. Otherwise, proceed to block 50 (see below).

5. If block 42 determined that queue lock mode is not in effect, implement block 50 to determine whether there are enough CPUs spinning on the ticket lock to warrant a switch to queue lock mode. If the answer is no, block 52 informs the environment that other execution threads may be scheduled, and block 54 then returns to the caller to advise that the requester still does not hold the ticket-queue lock.

6. If block 50 determined that there are enough spinning CPUs to warrant a switch to queue lock mode, block 56 performs processing to enter queued mode, as described below in connection with FIG. 6, and to acquire the queue lock, per FIG. 7. Block 58 determines whether queue lock acquisition was successful. If not, processing proceeds to blocks 52 and 54, described above. If the queue lock has been acquired, block 60 returns to the caller to advise that the requester now holds the ticket-queue lock.

Entering Queued Mode

Figure 6:
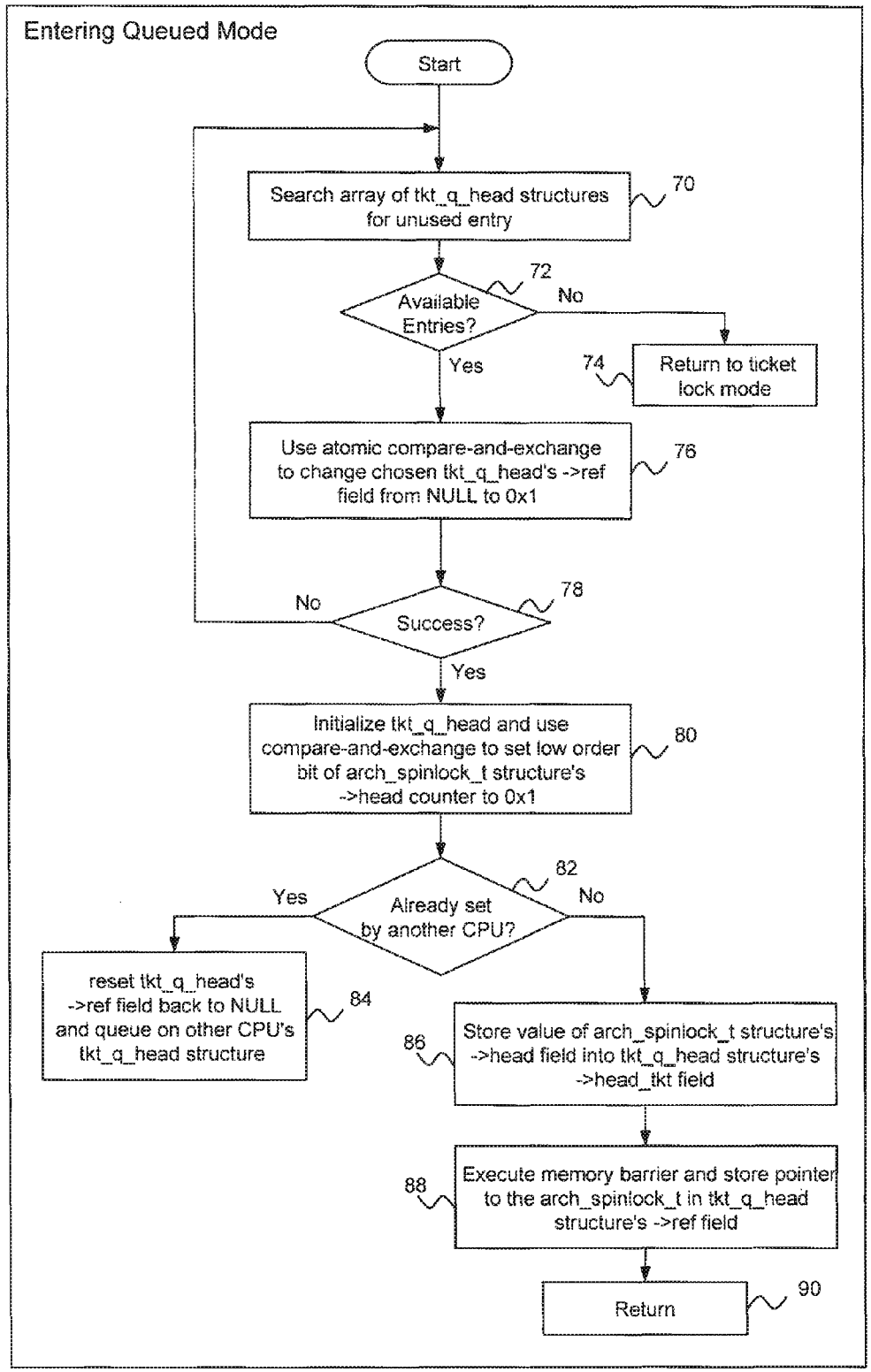
FIG. 6 is a flow diagram showing example queued mode entry processing.

FIG. 6 presents an overview of queued mode entry processing, as performed in block 56 of FIG. 5. As described above in connection with FIG. 5, on each pass through the ticket lock acquisition spin pass loop, each CPU checks in block 50 to see if there are enough CPUs spinning to make queuing worthwhile. If so, the CPU does the following:

1. Per block 70 of FIG. 6, search the array 16 of tkt_q_head structures 14 for an unused entry. Per block 72, if there are no unused entries, the CPU goes back to the ticket-lock spin loop in block 74. Otherwise, continue to block 76.

2. Per block 76, use a atomic compare-and-exchange (cmpxchg) operation to change the chosen tkt_q_head structure's →ref field 14a from NULL to 0x1. Per block 78, if this fails, some other CPU beat us to this structure, so return to block 70 to go look for another. Otherwise, continue to block 80.

3. Per block 80, initialize the tkt_q_head structure, and use cmpxchg to set the low-order bit of the arch_spinlock_t structure's →head counter 10b to 1. Per block 82, if some other CPU has already initialized, block 84 resets the chosen tkt_q_head structure's →ref field 14a back to NULL and queues this CPU on the other CPU's structure by implementing queued mode lock acquisition per FIG. 7. Otherwise, if block 82 determines that this CPU successfully initialized in block 80, processing continues to block 86.

4. Per block 86, the cmpxchg operation of block 80 will have returned the value of the arch_spinlock_t structure's →head field 10b, so store this into the tkt_q_head structure's →head_tkt field 14b.

5. Per block 88, execute a memory barrier and store a pointer to the arch_spinlock_t structure 10 into the tkt_q_head structure's →ref field 14a. The memory barrier ensures that the tkt_q_head structure's initialization is seen as happening before the →ref field assignment.

At this point, other CPUs attempting to acquire the same arch_spinlock_t (ticket lock) structure 10 will start queuing on the tkt_q_head structure.

Queued-Mode Lock Acquisition

Figure 7:
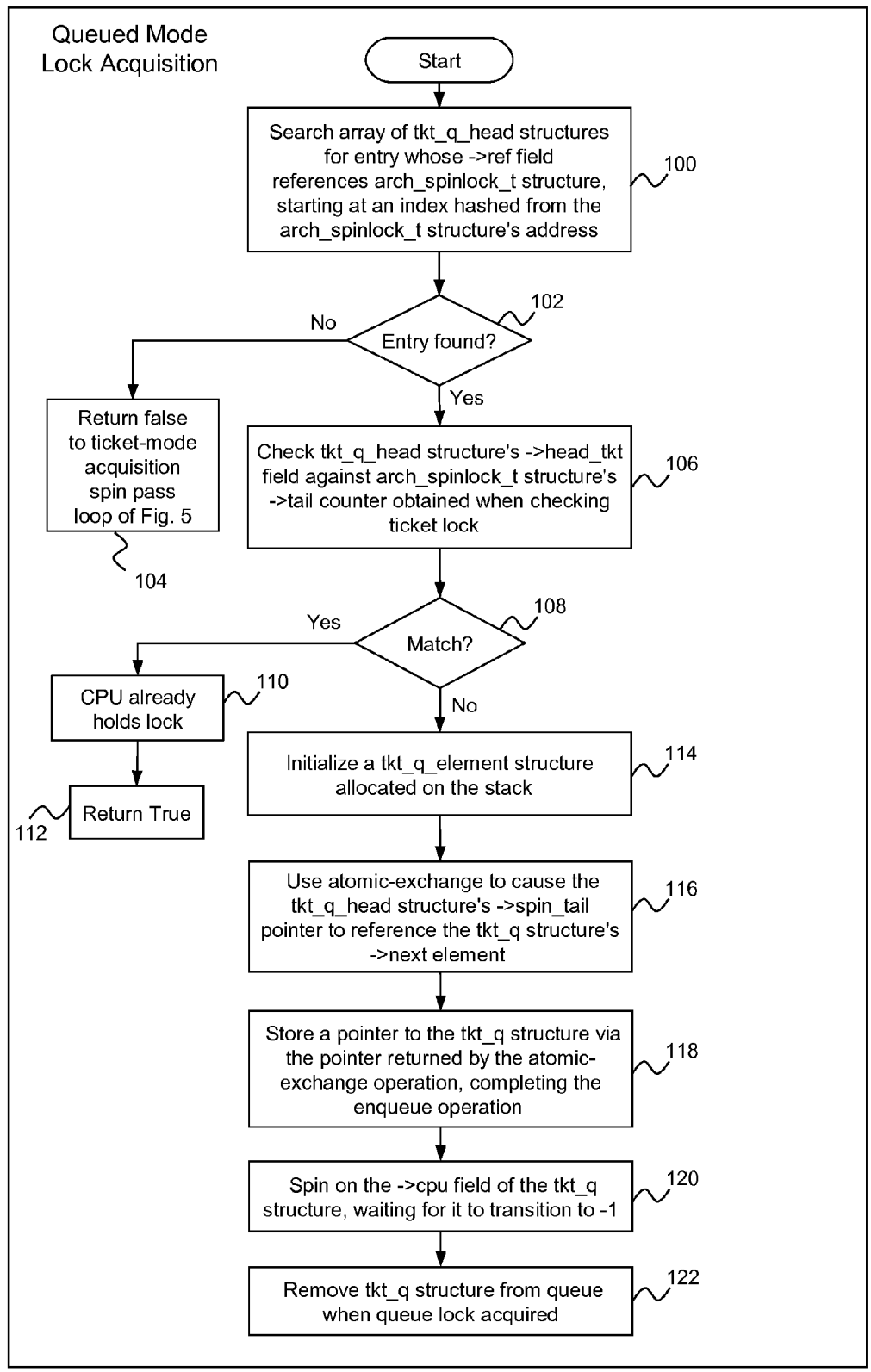
FIG. 7 is a flow diagram showing queued mode lock acquisition processing.

Once the ticket lock is in queued mode, the normal comparison of the arch_spinlock_t structure's →head and →tail fields 10a and 10b is guaranteed to fail due to the low-order bit of the →head counter 10b being set and that of →tail counter 10a being clear. This will force execution into the ticket lock acquisition spin pass loop of FIG. 5, where a check for the low-order bit of the →head field 10b in block 40 will cause the CPU to perform queued mode lock acquisition in block 44 to enqueue itself on the corresponding tkt_q_head structure 14 in block. FIG. 7 presents an overview of queued mode lock acquisition processing, which may be performed as follows:

1. Per block 100, search the array 16 of tkt_q_head structures 14 for the entry whose →ref field 14a references the CPU's arch_spinlock_t structure 10, starting at an index hashed from the arch_spinlock_t structure's address. Per block 102, if no such entry is found, for example because the entry is still in the process of being initialized, block 104 returns back to the ticket lock acquisition spin pass loop of FIG. 5 with an indication that the ticket-queue lock was not acquired. Otherwise, a tkt_q_head structure 14 associated with the CPU's arch_spinlock_t structure 10 was found, and processing continues to block 106.

2. Per block 106, check the tkt_q_head structure's →head_tkt field 14b against the value of the arch_spinlock_t structure's →tail counter 10a ticket obtained when checking into the ticket lock. Per block 108, if these match, this CPU already holds the ticket-queue lock in block 110, and the requester may return successful lock acquisition to the caller in block 112 in order to proceed to its critical section. Otherwise, continue to block 114.

3. Per block 114, initialize a tkt_q queue element structure 12 allocated on the stack.

4. Per block 116, use an atomic-exchange (xchg) operation to cause the tkt_q_head structure's →spin_tail pointer 14d to reference the tkt_q structure's →next element 12a.

5. Per block 118, store a pointer to the tkt_q structure 12 via the pointer returned by the xchg operation above, completing the enqueue operation.

6. Per block 120, spin on the →cpu field 12b of the tkt_q structure 12, waiting for it to transition to −1, indicating queue lock acquisition.

7. Per block 122, remove the tkt_q structure 12 from the queue when the queue lock is acquired. If there is another tkt_q structure 12 enqueued after it, this can be accomplished by simply storing the other tkt_q structure's →next field 12a into the tkt_q_head structure's →spin field 14c. Otherwise, it is necessary to NULL the →spin pointer 14c and then use a cmpxchg operation to cause the →spin_tail pointer 14d to reference the →spin pointer. If this cmpxchg operation fails, block 122 is restarted. Otherwise, the queue lock is held.

The foregoing represents a rather heavy-weight sequence of events, but it happens off of the critical path. There is nothing for this CPU to do other than spin anyway.

Queued-Mode Lock Hand-off

Figure 8:
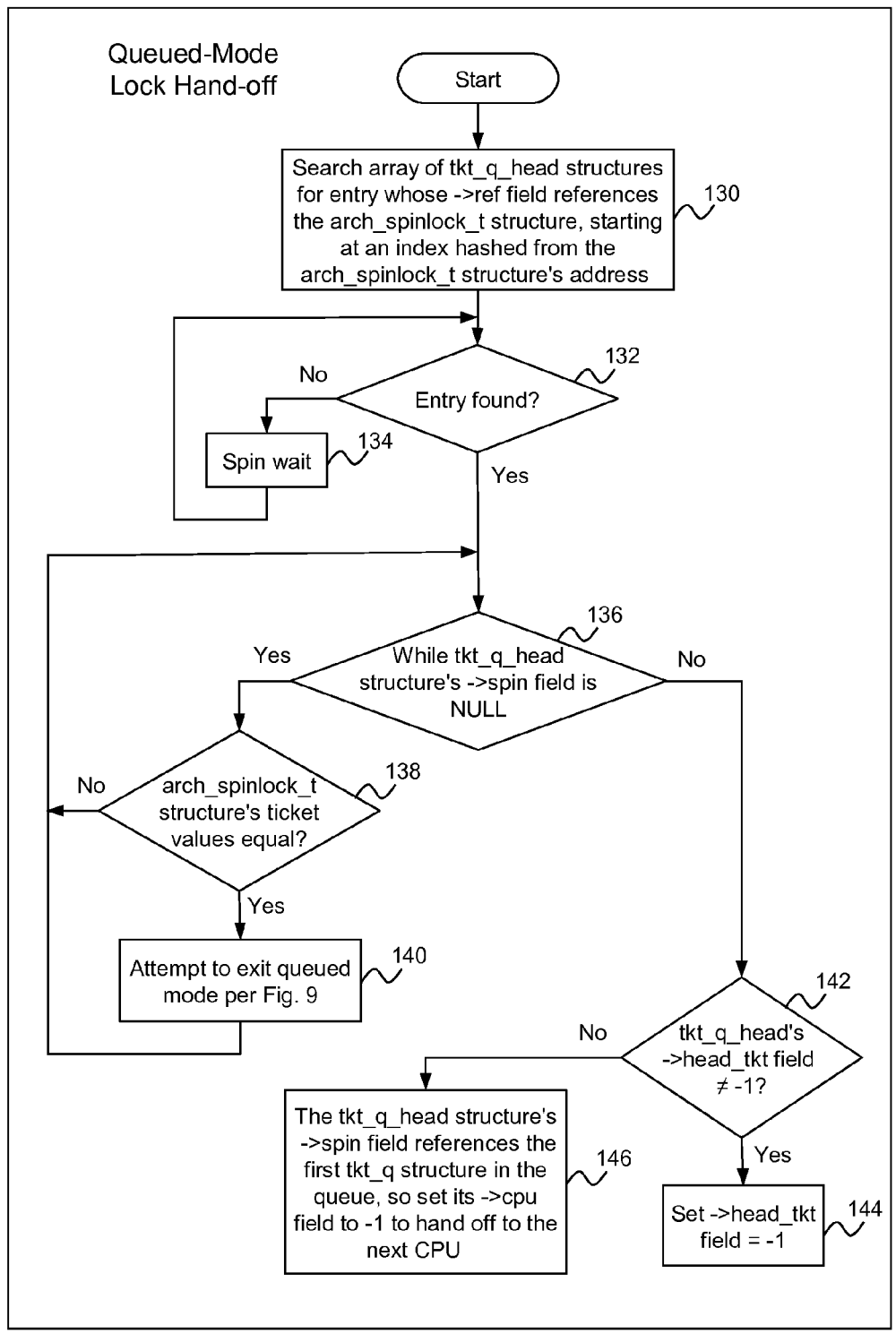
FIG. 8 is a flow diagram showing example queued mode lock hand-off processing.

As described above in connection with block 30 of FIG. 4, the CPU releasing the ticket lock may detect the need to do a queued-mode hand-off by checking the low-order bit of the arch_spinlock_t structure's →head field 10b. If this bit is set, the CPU hands off the lock in queued mode per block 32. FIG. 8 presents an overview of queued mode lock hand-off processing, which may be performed as follows:

1. Per block 130, search the array 16 of tkt_q_head structures 14 for the entry whose →ref field 14a references the CPU's arch_spinlock_t structure 10, starting at an index hashed from the arch_spinlock_t structure's address. Per block 132, if no such entry is found, for example because the entry is still in the process of being initialized, block 134 spin waits for it to appear. (Normally, the hashing reaches the right entry on the first try.) Otherwise, continue to block 136.

2. Per block 136, while the tkt_q_head structure's →spin field 14c is NULL, spin wait for it to become non-NULL, and if, per block 138, the arch_spinlock_t structure's →tail and →head counters 10a and 10b are of equal value, block 140 attempts to exit queued mode, as described below in connection with FIG. 9. Otherwise, if the →spin field is non-NULL in block 136, continue to block 142.

3. Per block 142, if the tkt_q_head structure's →head_tkt 14b field is not equal to −1, block 144 sets it to −1.

4. Otherwise, if the tkt_q_head structure's →head_tkt 14b field is equal to −1, the →spin field 14c references the first tkt_q structure 12 in the queue, so block 146 sets its →cpu field 12b to −1 to hand off to the next CPU.

If the queue lock is heavily utilized, the spin loops in the above procedure will not repeat. The tkt_q_head structure 14 will have long since been fully initialized and there will be a long queue hanging off its →spin field 14. Therefore, under conditions of heavy utilization, the above procedure is lightweight.

Exiting Queued Mode

Figure 9:
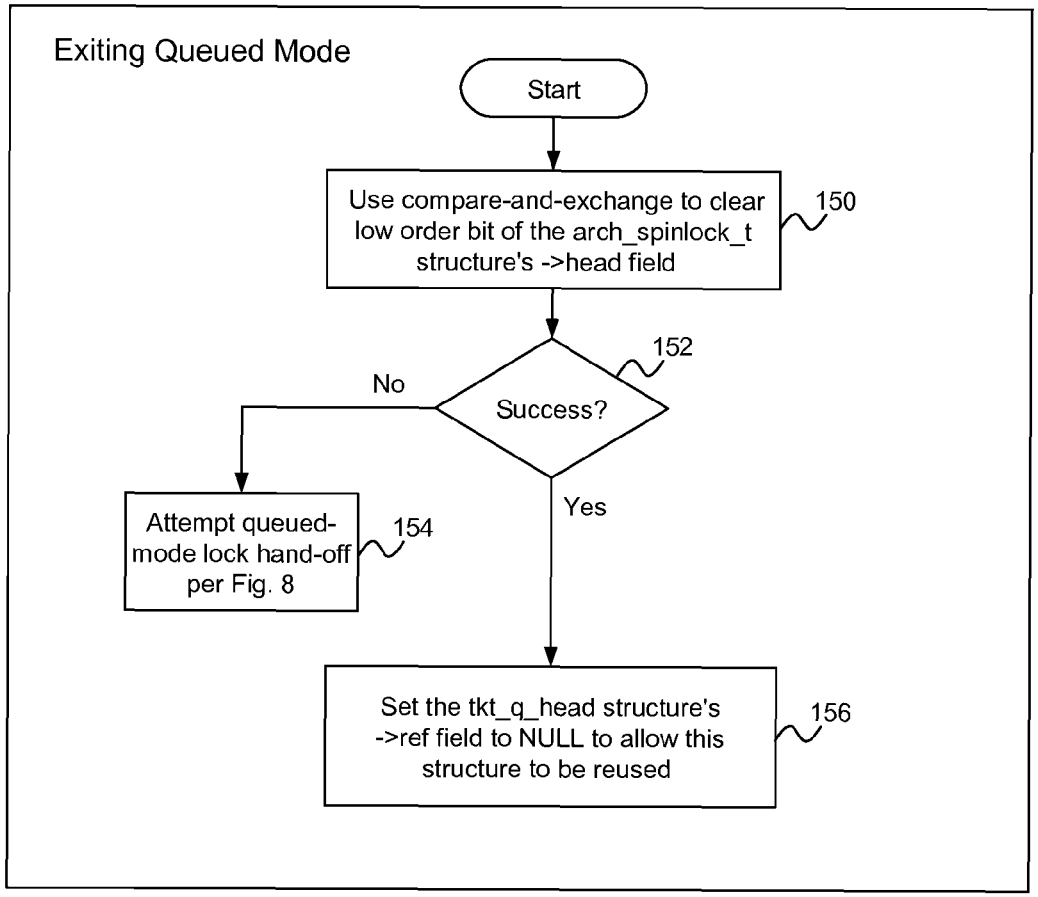
FIG. 9 is a flow diagram showing example queued mode exit processing.

As noted in the previous section, when a CPU releasing the ticket-queue lock in queued mode determines in blocks 136-138 of FIG. 8 that there are no CPUs waiting to acquire the lock, the first CPU will attempt to exit queued mode in block 140. FIG. 9 presents an overview of queued mode exit processing, which may be performed as follows:

1. Per block 150, use a cmpxchg operation to clear the low-order bit of the arch_spinlock_t structure's →head field 10b. Per block 152, if this fails, the failure was most likely due to the arrival of a new lock acquisition, which can then be handed off to, so block 154 attempts to hand off the lock per FIG. 8, remaining in queued mode. Otherwise, if the cmpxchg operation succeeds, continue to block 156.

2. Per block 156, set the tkt_q_head structure's →ref field 14a to NULL to allow this structure to be reused. Note that this approach will switch back to non-queued mode only if the lock goes completely idle. The section below entitled "Removing the Queue Early" describes how to switch back despite there being some CPUs still queued.

Resolving Race Conditions

There are four major ticket-queue lock operations that can participate in races, namely, (1) acquisitions, (2) releases, (3) switches to queued mode, and (4) switches to non-queued mode. However, the algorithm switches to non-queued mode only after the final release that leaves no requesters, so (2) and (4) may be combined. One may cover the cases of zero, one, and two or more concurrent operations of each type, for a total of 27 combinations. It might seem trivial to look at cases involving two concurrent release operations, but because this algorithm can take actions after a release operation, for example, switching to non-queued mode, it is at least conceptually possible for the end of one release operation to overlap with the next release operation.

Each of the 27 combinations is covered below. Acquisitions are denoted by the letter "A", releases by the letter "R", and switches to queued mode by the letter "Q". A given combination is therefore denoted by three characters, with "." indicating no operation, a lower case letter representing a single instance, and an upper-case character indicating multiple instances. For example, ". . . " indicates nothing happening, while "ARQ" indicating at least two each of acquisitions, releases, and switches to queued mode.

...: If nothing is happening, there can be no races.

..q: This scenario cannot happen because acquire operations switch to queued mode, so there must be at least as many acquire operations as there are switch-to-queue operations.

..Q: Again, this scenario cannot happen because acquire operations switch to queued mode, so there must be at least as many acquire operations as there are switch-to-queue operations.

.r.: If only a single release operation is in progress, there can be no races.

.rq: This scenario cannot happen because acquire operations switch to queued mode, so there must be at least as many acquire operations as there are switch-to-queue operations.

.rQ: This scenario cannot happen because acquire operations switch to queued mode, so there must be at least as many acquire operations as there are switch-to-queue operations.

.R.: Because this is an exclusive lock, it is not possible for two release operations to start at the same time. However, because a release operation can decide to switch to non-queued mode after doing its release, the tail end of one release operation could potentially overlap with the beginning of any subsequent release operation.

If a queued-mode release operation sees that the queue is empty and that the arch_spinlock_t structure's tickets indicate no new acquire operations, the release operation will use a cmpxchg operation try to switch to non-queued mode. If it succeeds, it is done, and the next acquire operation will acquire the lock using the non-queued ticket-lock mode.

On the other hand, if the cmpxchg operation fails, the lock remains in queued mode. Because the queue is empty, the release operation has not yet passed the lock on the next requester. Therefore the next requester cannot release the lock, and concurrent release operations cannot happen, and this reduces to scenario .r.

.Rq: As noted in .R., concurrent release operations cannot happen, so this scenario cannot happen.

.RQ: As noted in .R., concurrent release operations cannot happen, so this scenario cannot happen.

a..: If only a single acquire operation is in progress, there can be no races.

a.q: If there is only one acquire operation and one switch-to-queue operation, they must be the same operation, and there can be no races.

a.Q: This scenario cannot happen because only acquisition attempts will carry out switch-to-queue operations, so if there is only one acquisition attempt, there cannot be multiple switch-to-queue operations.

ar.: This race breaks down into multiple scenarios.

First, if the queue already contains at least one element, then the release operation will interact with the first element of the queue by setting its →cpu field 12b to −1 while the acquire operation is adding itself to the end of the queue. In this case, there is no interaction between the acquire and release operations.

Second, if the queue is empty, but the acquire increments the arch_spinlock_t structure's →tail field 10a before the release operation increments that structure's →head field 10b, the release operation will realize that there is an acquire to hand off to, and will spin waiting for the acquire operation to enqueue itself, then proceed as in the first scenario above.

Third, if the queue is empty, but the release operation increments the arch_spinlock_t structure's →head field 10b before the acquire operation increments that structure's →tail field 10a, the release operation will be unaware of the acquire operation, and will therefore attempt to switch to non-queued mode. If the acquire operation increments the arch_spinlock_t structure's →tail field 10a before the release operation attempts to clear the bottom bit of the →head field 10b, the release operation's attempt will fail, which will make the release operation aware of the presence of the acquire operation. The release operation will then wait for the acquire operation to enqueue itself as in the second scenario above.

Fourth and finally, if events proceed as described in the third scenario, except that the release operation manages to clear the bottom bit of the →head field 10b before the acquire operation increments the arch_spinlock_t structure's →tail field 10a, then the acquire operation will see the arch_spinlock_t structure 10 as being in non-queued mode, and will immediately proceed to its critical section, just as if this were a pure ticket lock. The release operation will then clear the tkt_q_head structure's →ref field 14a, thus making the tkt_q_head structure 14 available for future use.

arq: Given that there is an attempted switch-to-queue operation in flight, there cannot be only one acquisition attempt unless the ticket-queue lock is configured to switch to queue mode with only one waiting acquisition attempt. However, it is good to handle misconfiguration gracefully, as will now be described.

This race is resolved via atomic operations on the arch_spinlock_t structure 10. The release operation will be atomically adding the value 2 to the →head field 10b, while the switch-to-queue operation will be atomically setting the low-order bit of the same field.

The tkt_q_head structure 14 on lines 19-24 of Code Listing 1 is the queue lock's queue head. As also shown in FIG. 2, an array 16 of tkt_q_head structures is provided, indexed by a hash function of the address of the corresponding arch_spinlock_t 10 (at least in the common case of no collisions). The →ref field 14a of a tkt_q_head structure 14 is NULL if there is no associated arch_spinlock_t structure 10, 0x1 if such a ticket lock is in the process of being associated with this tkt_q_head structure, or the address of the ticket lock if the association is in full force. The →head_tkt field 14b is used to resolve a race condition between associating a ticket lock with a queue on the one hand and releasing the ticket lock on the other. The →spin field 14c references the first tkt_q structure 12 on the queue, or is NULL if the queue is empty. The →spin_tail field 14d references the →next field 12a of the last tkt_q structure 12 on the queue, or references the →spin field 14c if the queue is empty.

If the release operation happens first, then all of the acquire operations will enqueue themselves. However, the release operation will be completed, so that the CPU at the head of the queue will never be awakened, resulting in a hang. In order to prevent this hang, the switch-to-queue operation records the value of the arch_spinlock_t structure's →head field 10b into the →head_tkt field 14b of the tkt_q_head structure 14 before setting the →ref field 14a to reference the arch_spinlock_t structure 10 ("before" as in there is a memory barrier between the two stores). Before enqueuing themselves, each of the acquire operations checks the →head_tkt field 14b. If it matches, they hold the lock and therefore enter their critical section without enqueuing themselves (but, optionally, only after setting the →head_tkt field 14b to −1 in order to prevent problems with ticket wraparound), and if not, they queue themselves normally.

If the switch-to-queue operation happens first, the release operation will spin waiting for the first acquire operation to queue itself and then hand off. However, the tkt_q_head structure's →head_tkt field 14b will be set to the release operation's ticket. Once again, to prevent problems with ticket wraparound, each release operation sets the →head_tkt field 14b to −1 just before doing the hand-off.

arQ: This scenario cannot happen because only acquisition attempts will carry out switch-to-queue operations, so if there is only one acquisition attempt, there cannot be multiple switch-to-queue operations.

aR.: As noted in .R., concurrent release operations cannot happen, so this scenario cannot happen.

aRq: As noted in .R., concurrent release operations cannot happen, so this scenario cannot happen.

aRQ: As noted in .R., concurrent release operations cannot happen, so this scenario cannot happen.

A..: When multiple acquire operations arrive while in queued mode, they each use an xchg operation to make the tail pointer reference their tkt_q structures 12. These xchg operations will happen in some order, which will determine the order of the two acquire operations on the queue.

A.q: Each acquire operation will interact with the switch-to-queue operation as described in scenario a.q. If both acquire operations end up needing to enqueue themselves, ordering on the queue is resolved as described in scenario A.. above.

A.Q: Multiple switch-to-queue operations can interact in a number of ways. First, they can attempt to use the same tkt_q_head structure 14. In this case, they will all attempt to use a cmpxchg operation to update this structure's →ref field 14*a* from NULL to 0x1. One of them will succeed, thus gaining ownership of the structure, and will then proceed to initialize it. The others will lose, and will sequence through to another structure.

Second, if multiple operations are acting on the same arch_spinlock_t structure 10, they could each initialize a separate tkt_q_head structure 14, and then all attempt to associate their tkt_q_head structure with the arch_spinlock_t structure. In this case, they will all attempt to set the low-order bit of the →head field 10*b* of the arch_spinlock_t structure 10. One of them will succeed, and will then set the tkt_q_head structure's →ref field 14*a* to reference the arch_spinlock_t structure, which will in turn allow the other spinners to start queueing. The rest will fail, and will therefore set their tkt_q_head structure's →ref field back to NULL (thus allowing others to use them), and will eventually go spin on the winner's tkt_q_head structure 14. Of course, they cannot find the winner's tkt_q_head structure 14 until after the winner completes the assignment to the →ref field 14*a*, so until that happens, they will spin searching the array 16 of tkt_q_head structures 14.

Third, if multiple operations are acting on different arch_spinlock_t structure 10, each would each separately initialize its tkt_q_head structure 14 and associate it with its arch_spinlock_t structure.

Fourth and finally, if there are more queues needed than there are elements in the array 16 of tkt_q_head structures 14, the winners will each associate their tkt_q_head structure with their arch_spinlock_t structure 10. The losers will continue spinning on the arch_spinlock_t structure 10 itself in non-queued mode, but also continually check for one of the tkt_q_head structures 14 becoming available. If this proves to be a performance problem, one pragmatic solution is to increase the size of the array 16 of tkt_q_head structures 14.

After the switch-to-queue operations have resolved their races, the remaining acquire operations will resolve their races with the winning switch-to-queue operation and then with each other as described below.

If an acquire operation starts before a concurrent switch-to-queue operation has marked the low-order bit of the →head field 10*b* of the arch_spinlock_t structure 10, the new acquire operation will also attempt to switch to queued mode, resulting in the case discussed earlier in this section.

On the other hand, if the acquire operation starts after the concurrent switch-to-queue operation has marked the low-order bit of the →head field 10*b* of the arch_spinlock_t structure 10, the new acquire operation will attempt to add itself to the queue. Until the switch-to-queue operation sets the tkt_q_head structure's →ref field 14*a*, the acquire operation will be unable to find the tkt_q_head structure 14, and will spin, repeatedly checking the arch_spinlock_t structure 10 and searching the array 16 of tkt_q_head structures 14.

Once the →ref field 14*a* has been set to reference the arch_spinlock_t structure 10, the acquire operation will be able to find the tkt_q_head structure 14. The new acquire operation will therefore check the →head_tkt field 14*b*, and if it matches the acquire operation's ticket, set the →head_tkt field 14*b* to −1 and enter the critical section. Otherwise, if there is no match, the new acquire operation will enqueue itself.

Ar.: Each acquire operation will resolve its race with the release operation as described in scenario ar. above, and then the multiple acquire operations will resolve their race with each other as described in scenario A.. above.

However, there is one special case that can occur, and that is if one of the acquire operations enqueues itself, is handed off to, and is itself attempting to hand off the lock before the second acquire operation has fully enqueued itself. In this case, the first acquire operation will spin waiting for the second acquire operation to fully enqueue itself.

Arq: Each acquire operation will resolve its race against the release operation and the switch-to-queue operation as described in scenario arq above. Then the multiple acquire operations will resolve their race with each other as described in scenario A.

ArQ: The acquire and switch-to-queue operations will resolve their races as described in A.Q above, and the release operation will resolve its race with the winning switch-to-queue operation and the acquire operations operation as described in Arq above.

AR.: As noted in .R., concurrent release operations cannot happen, so this scenario cannot happen.

ARq: As noted in .R., concurrent release operations cannot happen, so this scenario cannot happen.

ARQ: As noted in .R., concurrent release operations cannot happen, so this scenario cannot happen.

Code Walkthrough

Ticket-Mode Acquisition and Release

Example source code (written in the C programming language) that may be used to implement ticket-mode acquisition and release (per FIG. 4) is shown in Code Listing 2 below:

```
                    Code Listing 2:

1    static __always_inline __ticket_spin_lock(arch_spinlock_t
     *lock)
2    {
3        register struct __raw_tickets inc = { .tail = 2 };
4
5        inc = xadd(&lock->tickets, inc);
6        for (;;) {
7            if (inc.head == inc.tail || tkt_spin_pass(lock, inc))
8                break;
9            inc.head = ACCESS_ONCE(lock->tickets.head);
10       }
11       barrier( ); /* smp_mb( ) on Power or ARM. */
12   }
13
14   static __always_inline __ticket_spin_unlock(arch_spinlock_t
     *lock)
15   {
16       __ticket_t head = 2;
17
18       head = xadd(&lock->tickets.head, 2);
19       if (head & 0x1)
20           tkt_q_do_wake(lock);
21   }
```

The ticket-mode acquisition function_ticket_spin_lock( ) is shown on lines 1-12 of the above code. This is similar to the v3.9 Linux-kernel implementation, with three differences. First, →tail is incremented by two rather than one, as shown on line 3, in order to leave room for the "queued" bit. Second, although line 7 checks the tickets, if they do not match, it also invokes tkt_spin_pass( ) (described below) to operate in queued mode if appropriate. Third, the call to cpu_relax( ) is buried in tkt_spin_pass( ).

The ticket-mode release function_ticket_spin_unlock( ) is shown on lines 14-21 of the above code. This is similar to the v3.9 Linux-kernel implementation, with two differences. First, the →head counter 10b is incremented by two rather than one, as shown on line 16, again in order to leave room for the "queued" bit. Second, that line 19 checks for the queued bit, and, if set, line 20 invokes tkt_q_do_wake( ) (described below) in order to hand the lock off the CPU at the head of the queue.

Ticket-Mode Acquisition Spin Pass

Example source code (written in the C programming language) that may be used to implement ticket-mode acquisition spin pass (per FIG. 5) is shown in Code Listing 3 below:

```
Code Listing 3:
1   #if (CONFIG_NR_CPUS < 128)
2   #define TICKET_T_CMP_GE(a, b) (UCHAR_MAX / 2 >=
    (unsigned char)((a) − (b)))
3   #else
4   #define TICKET_T_CMP_GE(a, b) (USHRT_MAX / 2 >=
    (unsigned short)((a) − (b)))
5   #endif
6
7   bool tkt_spin_pass(arch_spinlock_t *ap, struct ___raw_tickets inc)
8   {
9       if (unlikely(inc.head & 0x1)) {
10          if (tkt_q_do_spin(ap, inc))
11              return true;
12      } else if
        (TICKET_T_CMP_GE(ACCESS_ONCE(ap->tickets.tail) −
        TKT_Q_SWITCH,
13              ACCESS_ONCE(ap->tickets.head))) {
14          if (tkt_q_start_contend(ap, inc))
15              return true;
16      }
17      cpu_relax( );
18      return false;
19  }
```

The above code shows TICKET_T_CMP_GE( ) on lines 1-5, which does a modular comparison of two unsigned values, and tkt_spin_pass( ) on lines 7-19, which executes one pass through the non-queued ticket-lock spin pass loop. TICKET_T_CMP_GE( ) is equivalent to the signed twos-complement computation a−b>=0, but has the advantage of giving a defined result in C and C++ (overflow of signed integers is undefined in C++). There are two definitions of TICKET_T_CMP_GE( ) (line 2 and line 4) in order to allow small systems to conserve memory. If systems with more than 32,768 CPUs are required, an additional definition for 32-bit tickets can easily be added.

The tkt_spin_pass( ) function executes one pass through the non-queued ticket-lock spin pass loop, being invoked repeatedly by _ticket_spin_lock( ) in Code Listing 2. Line 9 checks to see if the lock is in queued mode, and if so, line 10 invokes tkt_q_do_spin( ) (described below in Code Listing 4) to enqueue this CPU and spin on its queue element. If tkt_q_do_spin( ) returns true, we hold the lock, in which case line 11 returns true to tell the caller the good news.

Otherwise, lines 12-13 check to see if there are at least TKT_Q_SWITCH/2 CPUs spinning on the lock. If so, line 14 invokes tkt_q_start_contend( ) (described below in Code Listing 6) in order to associate a queue with the specified ticket lock. If tkt_q_start_contend( ) returns true, we hold the lock, so line 15 returns true to tell the caller the good news.

Otherwise, line 17 tells the environment that this CPU isn't doing anything important (thus allowing other hardware threads or other virtual CPUs more processing power), and line 18 returns false to tell the caller that we have thus far failed to acquire the lock.

Enqueue and Spin

As described above, when tkt_spin_pass( ) (Code Listing 3) determines that a queue is in use, it invokes tkt_q_do_spin( ). This function locates the tkt_q_head structure 14 corresponding to the specified arch_spinlock_t structure 10, then enqueues itself and spins waiting to be granted the lock. If there is no corresponding tkt_q_head structure 14, this function returns false to the caller, so that the spinning continues in non-queued mode. This situation can arise while the queue is in the process of being either associated with or disassociated from the specified arch_spinlock_t structure 10. Example source code (written in the C programming language) that may be used to implement the enqueue and spin operations is shown in Code Listing 4 below. This code represents an example embodiment of the queued mode lock acquisition processing of FIG. 7:

```
Code Listing 4:
1   bool tkt_q_do_spin(arch_spinlock_t *asp, struct ___raw_tickets
    inc)
2   {
3       struct tkt_q **oldtail;
4       struct tkt_q tq;
5       struct tkt_q_head *tqhp;
6
7       smp_mb( );
8       tqhp = tkt_q_find_head(asp);
9       if (tqhp == NULL)
10          return false;
11      tq.cpu = raw_smp_processor_id( );
12      tq.tail = inc.tail;
13      tq.next = NULL;
14      if (ACCESS_ONCE(tqhp->head_tkt) == inc.tail) {
15          tqhp->head_tkt = −1;
16          return true;
17      }
18      oldtail = xchg(&tqhp->spin_tail, &tq.next);
19      ACCESS_ONCE(*oldtail) = &tq;
20      while (ACCESS_ONCE(tq.cpu) != −1)
21          cpu_relax( );
22      if (tq.next == NULL) {
23          tqhp->spin = NULL;
24          if (cmpxchg(&tqhp->spin_tail,
25                  &tq.next,
26                  &tqhp->spin) == &tq.next)
27              return true;
28          while (tq.next == NULL)
29              cpu_relax( );
30      }
31      smp_mb( );
32      ACCESS_ONCE(tqhp->spin) = tq.next;
33      return true;
34  }
```

In the above code, line 7 executes a memory barrier to ensure that the read from the arch_spinlock_t structure's →head field 10b happens before the search of the array 16 of tkt_q_head structures 14. Line 8 invokes tkt_q_find_head( ) to locate the tkt_q_head structure 14 associated with the arch_spinlock_t structure 10 referenced by asp. If line 9 sees that the return from tkt_q_find_head( ) was NULL, line 10 returns false, so that the caller will continue spinning in non-queued mode.

Lines 11-13 initialize the on-stack tkt_q structure 12, and line 14 checks to see if the last holder of the lock handed off in ticket mode just prior to the tkt_q_head structure 14 being associated, and if so, whether the →head_tkt field 14b indicates that the current CPU is the next lock holder. If the current CPU is the new lock holder based on this ticket, line 15 invalidates the →head_tkt field 14b and line 16 returns true to indicate that this CPU now holds the lock.

Otherwise, line 18 atomically exchanges this CPU's queue element with the →spin_tail field 14d to place this CPU into the queue. Line 19 makes the previous queue element (or the tkt_queue_head structure's →spin field 14c if the queue is empty) point to this CPU's queue element. Then lines 20 and 21 spin waiting for the lock to be handed off.

Lines 22-32 unlink this CPU's queue element from the queue. Lines 22-30 handle the case where the queue becomes empty as follows. Line 23 setting the →spin queue-header pointer 14c to NULL, and then lines 24-26 use cmpxchg to shift the →spin_tail pointer 14d from this CPU's queue element's →next pointer 12a to the →spin queue header 14c. If this cmpxchg succeeds, line 27 returns true to indicate that this CPU now holds the lock. Otherwise, the cmpxchg failure was due to some other CPU enqueuing itself, so lines 28 and 29 wait for this enqueue operation to complete.

If the queue was and now remains non-empty, line 31 ensures that the prior spin loops are seen to complete before the queue is updated, line 32 unlinks this CPU's element from the queue, and finally line 33 returns true to indicate that this CPU now holds the lock.

Find Queue

The example source code in Code Listing 5 below (written in the C programming language) shows the functions that may be used to handle mapping from an arch_spinlock_t structure 10 to its associated queue. This code may be used to perform certain aspects of the enter queued mode processing of FIG. 6, the queued mode lock acquisition processing of FIG. 7, and the queued mode lock hand-off processing of FIG. 8:

---
Code Listing 5:
---
```
1   static int tkt_q_next_slot(int i)
2   {
3       return (++i < TKT_Q_NQUEUES) ? i : 0;
4   }
5
6   static unsigned long tkt_q_hash(arch_spinlock_t *asp)
7   {
8       return (((unsigned long)asp) >> 8) % TKT_Q_NQUEUES;
9   }
10
11  static struct tkt_q_head *tkt_q_find_head(arch_spinlock_t *asp)
12  {
13      int i;
14      int start;
15
16      start = i = tkt_q_hash(asp);
17      do
18          if (tkt_q_heads[i].ref == asp)
19              return &tkt_q_heads[i];
20      while ((i = tkt_q_next_slot(i)) != start);
21      return NULL;
22  }
```

The tkt_q_next_slot( ) function on lines 1-4 finds the next slot in the array of tkt_q_head structures, if necessary wrapping from the last slot to the first. This function is called by the tkt_q_find_head( ) function of lines 11-21, which in turn is called on line 8 of the tkt_q_do_spin( ) in Code Listing 4. As previously mentioned, Code Listing 4 represents an example embodiment of the queued mode lock acquisition processing of FIG. 7. The tkt_q_next_slot( ) function is also called on line 15 of the tkt_q_start_content( ) function of Code Listing 6 below. As will be described, Code Listing 6 represents an example embodiment of the enter queued mode processing of FIG. 6.

The tkt_q_hash( ) function on lines 6-9 computes a very naïve hash function for reducing average search times through the array. This function is also called by the tkt_q_find_head( ) function of lines 11-21, which as mentioned above, is called on line 8 of the tkt_q_do_spin( ) in Code Listing 4. As noted, Code Listing 4 represents an example embodiment of the queued mode lock acquisition processing of FIG. 7. The tkt_q_hash( ) function is also called on line 6 of the tkt_q_start_content( ) function of Code Listing 6 below. Again, Code Listing 6 represents an example embodiment of the enter queued mode processing of FIG. 6.

The tkt_q_find_head( ) function on lines 11-22 performs the actual search. This function is designed for use by the queued mode lock acquisition processing of FIG. 7, and also for use by the queued mode lock hand-off processing of FIG. 8. Line 16 uses tkt_q_hash to compute a starting point in the array based on the arch_spinlock_t structure's address. In the common case, this hashing causes the first slot searched to contain the desired tkt_q_head structure 14. The loop spanning lines 17-20 searches the array, and if line 18 finds a match, line 19 returns a pointer to the array element. Otherwise, once line 20 determines that the entire array has been scanned, line 21 returns NULL. A NULL return is expected behavior during the time that a tkt_q_head structure 14 is being associated with or disassociated from the arch_spinlock_t structure 10.

Switch to Queued Mode

Before any CPU can spin on a queue or even find a queue element, that queue must be associated with the ticket lock. This is the job of tkt_q_start_contend( ), a source code example of which (written in the C programming language) is shown in Code Listing 6 below. As noted above, this code represents an example embodiment of the enter queue mode processing of FIG. 6:

---
Code Listing 6:
---
```
1   bool tkt_q_start_contend(arch_spinlock_t *asp, struct
        __raw_tickets inc)
2   {
3       int i;
4       int start;
5
6       start = i = tkt_q_hash(asp);
7       do {
8           if (cmpxchg(&tkt_q_heads[i].ref,
9                   NULL,
10                  (arch_spinlock_t *)0x1) == NULL) {
11              return tkt_q_init_contend(i, asp, inc);
12          }
13          if (ACCESS_ONCE(asp->tickets.head) & 0x1)
14              return tkt_q_do_spin(asp, inc);
15      } while ((i = tkt_q_next_slot(i)) != start);
16      return false;
17  }
```

As with the tkt_q_find_head( ) function of Code Listing 5, line 6 of Code Listing 6 invokes tkt_q_hash( ) to find a starting point in the array of tkt_q_head( ) structures 14. The loop spanning lines 7-15 searches the array for an unused element. Lines 8-10 use cmpxchg to switch a NULL →ref field 14a with 0x1, and if successful, line 11 invokes tkt_q_init_contend( ) to initialize the newly reserved tkt_q_head structure 14. Note that it would be possible to check for NULL before doing the cmpxchg, which would be a good optimization should some workload result in multiple arch_spinlock_t structures 10 entering and exiting queued mode extremely frequently. However, the common case is likely that few arch_spinlock_t structures 10 are that highly contented, so that the first probe into the array can be expected to succeed.

If the cmpxchg fails, for example, if the tkt_q_head structure 14 is already in use, line 13 checks to see if some other CPU has succeeded in associating a queue with this lock, and if so, line 14 invokes tkt_q_do_spin( ) to allow this CPU to enqueue and spin on that other CPU's queue. Otherwise, line 15 advances to the next slot.

If all slots are busy, and no other CPU has managed to associate a queue with the specified arch_spinlock_t structure 10, line 16 returns false so that the caller will continue spinning in non-queued mode.

The example source code in Code Listing 7 below (written in the C programming language) shows tkt_q_init_contend( ) function of Code Listing 6, which initializes the tkt_q_head structure 14 chosen by the caller for association with the specified arch_spinlock_t structure 10.

| Code Listing 7: |
|---|
| 1  static bool |
| 2  tkt_q_init_contend(int i, arch_spinlock_t *asp, struct |
|        ___raw_tickets inc) |
| 3  { |
| 4      arch_spinlock_t asold; |
| 5      arch_spinlock_t asnew; |
| 6      struct tkt_q_head *tqhp; |
| 7  |
| 8      tqhp = &tkt_q_heads[i]; |
| 9      tqhp->spin = NULL; |
| 10     tqhp->spin_tail = &tqhp->spin; |
| 11     do { |
| 12         asold.head_tail = ACCESS_ONCE (asp->head_tail); |
| 13         asnew = asold; |
| 14         if (asnew.tickets.head & 0x1) { |
| 15             smp_mb( ); |
| 16             ACCESS_ONCE(tqhp->ref) = NULL; |
| 17             return tkt_q_do_spin(asp, inc); |
| 18         } |
| 19         asnew.tickets.head |= 0x1; |
| 20     } while (cmpxchg(&asp->head_tail, |
| 21         asold.head_tail, |
| 22         asnew.head_tail) != asold.head_tail); |
| 23     tqhp->head_tkt = asold.tickets.head; |
| 24     smp_mb( ); |
| 25     ACCESS_ONCE(tqhp->ref) = asp; |
| 26     return tkt_q_do_spin(asp, inc); |
| 27  } |

Line 8 sets up a local pointer for brevity of expression, and lines 9 and 10 initialize the queue to empty. Each pass through the loop spanning lines 11-22 attempts to set the low-order bit of the arch_spinlock_t structure's →head field 10b to indicate that the lock is now in queued mode. Lines 12 and 13 pick up copies of the →head field 10b, and if line 14 sees that some other CPU has beat this one to setting the low-order bit, line 15 ensures that line 16's freeing of the tkt_q_head structure happens after lines 9's and 10's attempted initialization, and finally line 17 invokes tkt_q_do_spin( ) in order to spin on the new queue. Otherwise, line 19 sets the low-order bit and lines 20-22 use cmpxchg to attempt to install this low-order bit into the →head field 10b. If the cmpxchg fails, we retry the loop body. On some platforms, the cmpxchg can be replaced with an atomic test-and-set operation, but only if this operation returns the entire pair of tickets. The advantage of an atomic test-and-set operation is that it is less subject to starvation in the face of an endless stream of rapid-fire lock acquisition and release operations. Alternatively, a biased load can be used on line 12 for platforms supporting this notion, such as, Itanium. However, most current systems execute instructions so much faster than data flows through the system that this should not be a problem in practice.

Otherwise, execution proceeds to line 23, which records the arch_spinlock_t structure's prior →head field 10b into the tkt_q_head structure's →head_tkt field 14b, where it is used to resolve races between lock release and this switch-to-queue operation. Line 24 ensures that the store into →head_tkt 14b happens before lines 25's store into →ref 14a, this latter store being the one that makes this tkt_q_head structure 14 accessible to CPUs wishing to enqueue themselves. Finally, line 26 invokes tkt_q_do_spin( ) to enqueue and spin.

Grant Lock in Queued Mode

The example source code in Code Listing 8 below (written in the C programming language) may be used to grant the lock to the CPU at the head of the queue when in queued mode. If the queue is empty, it invokes tkt_q_try_unqueue( ) to attempt to revert back to non-queued mode. This code represents an example embodiment of the queued mode lock hand-off processing of FIG. 8:

| Code Listing 8: |
|---|
| 1  void tkt_q_do_wake(arch_spinlock_t *asp) |
| 2  { |
| 3      struct tkt_q_head *tqhp; |
| 4      struct tkt_q *tqp; |
| 5  |
| 6      while ((tqhp = tkt_q_find_head(asp)) == NULL) |
| 7          cpu_relax( ); |
| 8      for (;;) { |
| 9          tqp = ACCESS_ONCE(tqhp->spin); |
| 10         if (tqp != NULL) |
| 11             break; |
| 12         if (tkt_q_try_unqueue(asp, tqhp)) |
| 13             return; |
| 14         cpu_relax( ); |
| 15     } |
| 16     if (ACCESS_ONCE(tqhp->head_tkt) != -1) |
| 17         ACCESS_ONCE(tqhp->head_tkt) = -1; |
| 18     smp_mb( ); |
| 19     ACCESS_ONCE(tqp->cpu) = -1; |
| 20  } |

Lines 6 and 7 invoke the tkt_q_find_head( ) function of Code Listing 5 to locate the queue. This can temporarily return NULL during queue setup, hence the loop. Each pass through the loop spanning lines 8-15 checks to see if there is a CPU to hand off to, and if not, invokes tkt_q_try_unqueue( ) (described below in Code Listing 9) to attempt to revert back to non-queued mode. Line 9 fetches a pointer to the element at the head of the queue, and if line 10 finds that this pointer is non-NULL, line 11 exits the loop. Otherwise, line 12 invokes tkt_q_try_unqueue( ) in an attempt to revert back to non-queued mode, and if successful, line 13 returns. Line 14 lets the underlying hardware or virtual environment know that this CPU isn't doing anything particularly important. In normal conditions, the queue will be fully formed, so that line 11 will exit the loop on the first pass.

Once a CPU has been found at the head of the queue, execution proceeds to lines 16 and 17, which invalidate the →head_tkt value to prevent spurious lock grants after the ticket values wrap around. The memory barrier on line 18 ensures that this CPU's critical section precedes the lock hand-off, and line 19 hands off the lock.

Switch Out of Queued Mode

The example source code in Code Listing 9 below (written in the C programming language) shows tkt_q_try_unqueue( ), which attempts to switch back to non-queued mode. This code represents an example embodiment of the queued mode exit processing of FIG. 9, and may be implemented as follows:

```
Code Listing 9:
1   static bool tkt_q_try_unqueue(arch_spinlock_t *asp,
      struct tkt_q_head *tqhp)
2   {
3       arch_spinlock_t asold;
4       arch_spinlock_t asnew;
5
6       asold = ACCESS_ONCE(*asp);
7       if ((asold.tickets.head & ~0x1) == asold.tickets.tail) {
8           asnew = asold;
9           asnew.tickets.head &= ~0x1;
10          if (cmpxchg(&asp->head_tail,
11              asold.head_tail,
12              asnew.head_tail) == asold.head_tail) {
13              ACCESS_ONCE(tqhp->ref) = NULL;
14              return true;
15          }
16      }
17      return false;
18  }
```

Line 6 picks up the pair of tickets 10*a* and 10*b* in the CPU's arch_spinlock_t structure 10, and Line 7 checks to see if the two tickets are equal (ignoring the low-order bit). If not, there is no CPU to hand off to, so the "if" statement body attempts to switch to non-queued mode. Lines 8 and 9 pick up the old tickets 10*a* and 10*b*, and clear the low-order bit. Then lines 10-12 use cmpxchg to attempt to clear the low-order bit from the arch_spinlock_t structure 10. If this attempt succeeds, line 13 sets the tkt_q_head structure's →ref field 14*a* to NULL, thus making the structure available to other locks, and then line 14 returns true to indicate that the switch succeeded. Otherwise, given that the cmpxchg failed, it is known that at least one CPU has arrived to acquire the lock. We know this because the current CPU is the only one that is permitted to update the →head field 10*b* because the queue is still associated with the lock. Line 17 therefore returns false to indicate that the switch failed, so that there is still a queue in place.

Embellishments

The following sections describe runtime tuning of the switch-to-queued-mode threshold, a response-time enhancement for tkt_q_head searching, for switching back to non-queued mode even though a few CPUs remain queued, and optimizations possible if each arch_spinlock_t structure is permanently associated with its own private tkt_q_head structure.

Runtime Selection of Queue-Associate Criteria

Instead of having a C-preprocessor macro for TKT_Q_SWITCH, read the value from sysfs. This approach would allow system administrators and cloud control mechanisms to tune the value at runtime.

Check for Ticket Grant while Searching for Tkt_q_Head Structure

If the array 16 of tkt_q_head structures 14 is too large and too full, a CPU searching that array for an empty slot might be granted the lock in non-queued mode, but fail to respond in a timely fashion. Although a pragmatic approach is to expand the size of the array so as to make long searches extremely unlikely, systems having worst-case response time requirements may need a different approach. For such systems, one solution is to check for ticket grant at the end of the loop in the tkt_q_start_contend( ) function on lines 6-15 of Code Listing 6.

To accomplish this, line 13 of the tkt_q_start_contend( ) function may be modified to fetch the asp→tickets.head field 10*b* into a temporary variable with the help of ACCESS_ONCE( ) The function would check the low-order bit, and if set invoke tkt_q_do_spin( ) as is currently done on line 14. Otherwise, the function would check to see if the ticket has reached the requester, and if so, would return true to acquire the lock.

It should be noted that if the low-order bit of asp→tickets.head 10*b* is set, it cannot be assumed that the requester has acquired the lock even if the ticket has reached its CPU. The reason for this is that the CPUs do not necessarily queue in ticket order, and if the low-order bit is set (indicating that the lock is in queued mode), then it is the queue order that matters.

Removing the Queue Early

In the preferred embodiment, the queue is removed only when completely empty. However, it is possible to remove the queue when the number of CPUs spinning decreases below a certain level. The idea is to use a separate value, for example, −2, to tell queued CPUs that it is time to go back and spin on the ticket lock in non-queued mode. When each CPU sees its tkt_q structure's →cpu field 12*b* equal to −2, it sets its successor's →cpu field to −2. All the CPUs are thus informed in a bucket-brigade style. If a large quantity of CPUs arrive in the meantime, the lock will switch back into queued mode, but using a different tkt_q_head structure 14. Of course, failure to apply hysteresis can result in many tkt_q_head structures 14 being busy disassociating themselves from the arch_spinlock_t structure 10.

The challenging part of this approach is determining when all lock acquisitions have enqueued themselves. The issue is that a given CPU might have located the old tkt_q_head structure 14 before the switch to non-queued mode, and might be delayed for an extended time period before enqueuing itself. Until it does enqueue itself it is not safe to free up the tkt_q_head structure 14. One way of solving this problem is to enclose the enqueue operations in RCU read-side critical sections, and to have the last CPU on the queue execute a synchronize_rcu( ) before freeing up the tkt_q_head structure 14. This approach has practical problems in the kernel, but could be appropriate for user-mode execution, assuming that ticket-queue lock acquisition is forbidden from within RCU read-side critical sections.

Dedicated Queue for Each Ticket Lock

Some simplifications and optimizations are possible if each arch_spinlock_t structure 10 has its own tkt_q_head structure 14:

1. There is no longer a need to search an array 16 to find the associated tkt_q_head structure 14. In fact, the tkt_q_head structure's fields can simply be added to the arch_spinlock_t structure 10.

2. The late-enqueue problem in Section entitled "Removing the Queue Early" disappears. A special value (for example, −2) can be stored into the →head_tkt field 14*b* so that late enqueuers can determine that they need to go back to spinning directly on the ticket lock.

3. Although it is still necessary to contend for the tkt_q_head structure 14 in order to determine who will initialize it, the winner is then guaranteed to be the only CPU attempting to set the low-order bit of the arch_spinlock_t structure's →head field 10b, and can therefore use an atomic increment to set it instead of the current cmpxchg loop.

4. It is no longer possible to run out of tkt_q_head structures 14, and thus no need to check for running out.

5. There is no need to maintain a pointer to the arch_spinlock_t structure 10, so the →ref field 14a is downgraded from a pointer to a bool, and renamed to →queuing.

The downside is that each arch_spinlock_t structure 10 grows in size by more than two pointers, which is acceptable in some situations but prohibitive in others. That said, it is important to note that the arch_spinlock_t structure 10 grows by a fixed amount, rather than by a function of the number of CPUs.

The example source code in Code Listing 10 below (written in the C programming language) shows the changes that can be made to the tkt_q_do_spin( ) function of Code Listing 4. These changes are straightforward.

Code Listing 10:

```
1   bool tkt_q_do_spin(arch_spinlock_t *asp, struct ___raw_tickets
    inc)
2   {
3       struct tkt_q **oldtail;
4       struct tkt_q tq;
5
6       smp_mb( );
7       if (!ACCESS_ONCE(asp->queuing))
8           return false;
9       tq.cpu = raw_smp_processor_id( );
10      tq.tail = inc.tail;
11      tq.next = NULL;
12      if (ACCESS_ONCE(asp->head_tkt) == inc.tail) {
13          asp->head_tkt = -1;
14          return true;
15      }
16      oldtail = xchg(&asp->spin_tail, &tq.next);
17      ACCESS_ONCE(*oldtail) = &tq;
18      while (ACCESS_ONCE(tq.cpu) != -1)
19          cpu_relax( );
20      if (tq.next == NULL) {
21          asp->spin = NULL;
22          if (cmpxchg (&asp->spin_tail, &tq.next, &asp->spin) ==
                &tq.next)
23              return true;
24          while (tq.next == NULL)
25              cpu_relax( );
26      }
27      smp_mb( );
28      ACCESS_ONCE(asp->spin) = tq.next;
29      return true;
30  }
```

The tkt_q_next_slot( ), tkt_q_hash( ), and tkt_q_find_head( ) functions of Code Listing 5 are no longer needed. The tkt_q_init_contend( ) function of Code Listing 7 is folded into the tkt_q_start_contend( ) function of Code Listing 6, as shown in the example source code (written in the C programming language) of Code Listing 11 below:

Code Listing 11:

```
1   bool tkt_q_start_contend(arch_spinlock_t *asp, struct
    ___raw_tickets inc)
2   {
3       arch_spinlock_t asold;
4       arch_spinlock_t asnew;
5
6       do {
7           asold.head_tail = ACCESS_ONCE(asp->head_tail);
8           asnew = asold;
9           if (asnew.tickets.head & 0x1) {
10              smp_mb( );
```

Code Listing 11:

```
11              return tkt_q_do_spin(asp, inc);
12          }
13          asnew.tickets.head |= 0x1;
14      } while (cmpxchg(&asp->head_tail, asold.head_tail,
            asnew.head_tail) !=
15          asold.head_tail);
16      asp->spin = NULL;
17      asp->spin_tail = &asp->spin;
18      asp->head_tkt = asold.tickets.head;
19      smp_mb( );
20      ACCESS_ONCE(asp->queuing) = true;
21      return tkt_q_do_spin(asp, inc);
22  }
```

The changes from Code Listings 6 and 7 are straightforward, with the main complication being the need to refrain from initializing the queue until setting the low-order bit of the →head field 10b. The changes to the tkt_q_do_wake( ) function of Code Listing 8 are also straightforward, as can be seen by comparing Code Listing 12, representing example source code for a modified version of tkt_q_do_wake( ) (written in the C programming language) with Code Listing 8 above.

Code Listing 12:

```
1   void tkt_q_do_wake(arch_spinlock_t *asp)
2   {
3       struct tkt_q *tqp;
4
5       while (!ACCESS_ONCE(asp->queuing))
6           cpu_relax( );
7       for (;;) {
8           tqp = ACCESS_ONCE(asp->spin);
9           if (tqp != NULL)
10              break;
11          if (tkt_q_try_unqueue(asp))
12              return;
13          cpu_relax( );
14      }
15      if (ACCESS_ONCE(asp->head_tkt) != -1)
16          ACCESS_ONCE(asp->head_tkt) = -1;
17      smp_mb( );
18      ACCESS_ONCE(tqp->cpu) = -1;
19  }
```

Finally, the changes to the tkt_q_try_unqueue( ) function of Code Listing 9 are also straightforward, as can be seen when comparing Code Listing 13, representing example source code for a modified version of tkt_q_try_unqueue( ) (written in the C programming language) with Code Listing 9 above.

Code Listing 13:

```
1   static bool tkt_q_try_unqueue(arch_spinlock_t *asp)
2   {
3       arch_spinlock_t asold;
4       arch_spinlock_t asnew;
5
6       asold = ACCESS_ONCE(*asp);
7       if ((asold.tickets.head & ~0x1) == asold.tickets.tail) {
8           asnew = asold;
9           asnew.tickets.head &= ~0x1;
10          if (cmpxchg(&asp->head_tail,
11              asold.head_tail,
12              asnew.head_tail) == asold.head_tail) {
13              ACCESS_ONCE(asp->queuing) = false;
14              return true;
```

Code Listing 13:

```
15        }
16      }
17      return false;
18    }
```

In short, substantial simplification is possible in situations where a larger arch_spinlock_t structure 10 can be tolerated.

Adaptive Spin-then-Sleep Locking

The ticket-queue lock can provide the paravirtualized spin-then-sleep functionality implemented in J. Fitzhardinge, *Paravirtualized ticketlocks*, lwn.net website, /Articles/493402/, April 2012. This decision is made by the CPUs actually spinning on their queue element. Before sleeping, they set their tkt_q structure's →cpu field 12b to some special value, for example the value −1 or for another example, their CPU number but with the top bit set.

Races between sleeping and grant are resolved by using xchg to assign new values. If the would-be sleeper sees −1 rather than its CPU number, it holds the lock and avoids sleeping. Similarly if the CPU attempting to grant the lock sees the special value instead of the CPU number, it wakes up the now-sleeping (or soon-to-be-sleeping) CPU. This approach allows the paravirtualized checks to be implemented off of the fastpath.

Accordingly, a technique for low overhead contention-based switching between ticket locking and queued locking has been disclosed. It will be appreciated that the foregoing concepts may be variously embodied in any of a data processing system, a machine implemented method, and a computer program product in which programming logic is provided by one or more machine-readable non-transitory data storage media for use in controlling a data processing system to perform the required functions. Example embodiments of a data processing system and machine implemented method were previously described in connection with FIG. 1-9.

Figure 10:
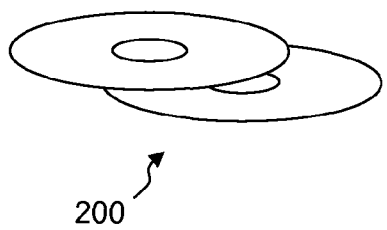
FIG. 10 is a diagrammatic illustration showing example computer-readable non-transitory data storage media that may be used to provide a computer program product in accordance with the present disclosure.

The computer program product may include a computer readable storage medium (or media) having computer readable program instructions thereon for causing a processor to carry out aspects of the present invention. Example computer readable storage media for storing such program instructions are shown by reference numerals 8 (memory) and 10 (cache) of the computer system 2 of FIG. 1. The system 2 may further include one or more secondary (or tertiary) storage devices (not shown) that could store the program instructions between system reboots. A further example of computer readable storage media that may be used to store the program instructions is shown by reference numeral 200 in FIG. 10. The computer readable storage media 200 are illustrated as being portable optical storage disks of the type that are conventionally used for commercial software sales, such as compact disk-read only memory (CD-ROM) disks, compact disk-read/write (CD-R/W) disks, and digital versatile disks (DVDs).

The computer readable storage medium can thus be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although various example embodiments have been shown and described, it should be apparent that many variations and alternative embodiments could be implemented in accordance with the disclosure. It is understood, therefore, that the invention is not to be in any way limited except in accordance with the spirit of the appended claims and their equivalents.

What is claimed is:

1. In a computer system having one or more processors operatively coupled to one or more memory devices, a method for low overhead contention-based switching between ticket locking and queued locking to access shared data in said one or more memory devices, comprising:
    establishing a ticket lock in said one or more memory devices, said ticket lock including a ticket lock acquisition counter and a ticket lock release counter;
    establishing a queue lock in said one or more memory devices, said queue lock having a queue lock head and a queue lock queue of zero or more queue lock elements, said queue lock head including a ticket lock reference field for associating said queue lock head with said ticket lock;
    operating in ticket lock mode using said ticket lock to access said shared data during periods of relatively low data contention; and
    operating in queue lock mode using said queue lock to access said shared data during periods of relatively high data contention.

2. The method of claim 1, wherein said ticket lock acquisition counter and a ticket lock release counter each have a reserved lock mode bit that is not incremented during normal ticket lock acquisition and release operations while in said ticket lock mode, and wherein a switch from said ticket lock mode to said queue lock mode comprises changing said ticket lock release counter's reserved lock mode bit from a ticket-lock state that signifies said ticket lock mode to a queue-lock state that signifies said queued lock mode.

3. The method of claim 1, wherein said periods of relatively low data contention and relatively high data contention are determined by one of a number of requesters spinning on said ticket lock, time spent spinning, lock hold time, or lock grants per unit time.

4. The method of claim 2, wherein said ticket lock mode comprises operations that include ticket lock acquisition, ticket lock release, ticket lock acquisition spin pass processing, and processing to transition from ticket lock mode to queue lock mode;
    said ticket lock acquisition including incrementing said ticket lock acquisition counter in a manner that does not change said ticket lock acquisition counter's reserved lock mode bit;
    said ticket lock release including incrementing said ticket lock release counter in a manner that does not change said ticket lock release counter's reserved lock mode bit, checking said ticket lock release counter's reserved lock mode bit to determine whether said queue lock mode is in effect, and if so, performing a queue lock mode hand-off;
    said ticket lock acquisition spin pass processing including checking said ticket lock release counter's reserve lock mode bit to determine if said queue lock mode is in effect, if so, performing a queue lock acquisition, and if not, checking for said high data contention, invoking said queue lock mode if said high data contention is detected and performing a queue lock acquisition; and
    said processing to transition from ticket lock mode to queue lock mode including setting said ticket lock reference field of said queue lock head to associate said queue lock head with said ticket lock, and setting said ticket lock release counter's reserve lock mode bit to said queue-lock state that signifies said queue lock mode.

5. The method of claim 2, wherein said queue lock mode comprises operations that include queue lock acquisition, queue lock hand-off, and processing to transition from queue lock mode to ticket lock mode;
    said queue lock acquisition including initializing a queue lock element on said queue lock queue, spinning on said queue lock element until said queue lock is acquired, and removing said queue lock element from said queue lock queue if said queue lock is acquired;
    said queue lock hand-off including determining if there is a queue lock element queued at the head of said queue lock queue, and if so, setting an indicator in said queue lock element to hand off said queue lock; and said processing to transition from queue lock mode to ticket lock mode including changing said ticket lock release counter's reserve lock mode bit to said state that signifies said ticket lock mode, and clearing said ticket lock reference field of said queue lock head to disassociate said queue lock head from said ticket lock.

6. The method of claim 1, wherein there are a plurality of said ticket locks and said queue locks, said queue locks each comprising one of said queue lock heads and of said queue lock queues, said queue lock heads being arranged in a searchable queue lock array that can be searched to identify a queue lock head associated with a selected one of said ticket locks using an address of said selected ticket lock that is stored in said queue lock head's ticket lock reference field, and at least one of said queue lock heads being associated with a corresponding one of said ticket locks.

7. The method of claim 1, wherein there are a plurality of said ticket locks, each of which is assigned to a dedicated queue lock queue.

\* \* \* \* \*